(12) United States Patent
Kotzur et al.

(10) Patent No.: US 10,936,420 B1
(45) Date of Patent: Mar. 2, 2021

(54) RAID STORAGE-DEVICE-ASSISTED DEFERRED Q DATA DETERMINATION SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 16/586,530

(22) Filed: Sep. 27, 2019

(51) Int. Cl.
| | |
|---|---|
| *G06F 11/10* | (2006.01) |
| *G11C 29/52* | (2006.01) |
| *G11C 29/04* | (2006.01) |
| *H04L 1/00* | (2006.01) |
| *H03M 13/00* | (2006.01) |
| *H03M 13/11* | (2006.01) |
| *G11C 16/26* | (2006.01) |
| *G11C 16/34* | (2006.01) |
| *G11C 16/04* | (2006.01) |
| *G11C 11/56* | (2006.01) |
| *G06F 13/28* | (2006.01) |

(52) U.S. Cl.
CPC .......... *G06F 11/1096* (2013.01); *G06F 13/28* (2013.01)

(58) Field of Classification Search
CPC .............................. G06F 11/1096; G06F 13/02
See application file for complete search history.

(56) References Cited

U.S. PATENT DOCUMENTS

| | | | |
|---|---|---|---|
| 5,774,641 A * | 6/1998 | Islam | G06F 11/1076 |
| | | | 714/6.12 |
| 6,526,477 B1 * | 2/2003 | Yuan | G06F 3/061 |
| | | | 710/52 |
| 9,384,093 B1 | 7/2016 | Aiello | |
| 2009/0144497 A1 * | 6/2009 | Withers | G06F 3/064 |
| | | | 711/114 |

(Continued)

OTHER PUBLICATIONS

Ostrovsky, Igor. "How RAID-6 dual parity calculation works", igoro.com, https://igoro.com/archive/how-raid-6-dual-parity-calculation-works/.

*Primary Examiner* — Guy J Lamarre
(74) *Attorney, Agent, or Firm* — Haynes and Boone, LLP

(57) ABSTRACT

A RAID storage-device-assisted deferred Q data determination system includes a RAID primary data drive that retrieves second primary data via DMA with a host system, and XOR's it with its first primary data to produce first interim parity data that it DMA's to a RAID parity data drive. The RAID parity data drive XOR's its first parity data and the first interim parity data to produce second parity data. The RAID parity data drive also performs GF operations on the first interim parity data and its second interim parity data and XOR's the results to produce first interim Q data that it DMA's to a RAID Q data drive. The RAID Q data drive XOR's the first interim Q data and its second interim Q data to produce third interim Q data that it XOR's with its first Q data to produce second Q data.

20 Claims, 25 Drawing Sheets

(56) References Cited

U.S. PATENT DOCUMENTS

| | | | | |
|---|---|---|---|---|
| 2010/0106906 A1* | 4/2010 | Galloway | ........... | G06F 11/1076 |
| | | | | 711/114 |
| 2010/0312961 A1* | 12/2010 | Koul | ................... | G06F 11/1076 |
| | | | | 711/114 |
| 2011/0264857 A1* | 10/2011 | Delaney | .............. | G06F 11/1076 |
| | | | | 711/114 |
| 2016/0246678 A1* | 8/2016 | Galbraith | .............. | G06F 3/0688 |
| 2017/0168896 A1* | 6/2017 | Karrotu | ................. | G06F 3/0689 |
| 2018/0203765 A1* | 7/2018 | Critchley | ............ | G06F 11/1076 |

* cited by examiner

RAID STORAGE-DEVICE-ASSISTED DEFERRED Q DATA DETERMINATION SYSTEM

BACKGROUND

The present disclosure relates generally to information handling systems, and more particularly to performing deferred Q data determination operations in an information handling system with the assistance of RAID storage devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID storage systems has been found to raise some issues.

For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID storage systems because the aggregate performance of the NVMe storage devices is typically much greater than the performance capabilities of the RAID storage controller provided for the RAID storage system (and that performance is even projected to be much greater than the performance capabilities of next-generation RAID storage controllers), which results in those RAID storage controllers being unable to manage more than a few NVMe storage devices (e.g., conventional RAID storage controllers are currently capable of managing approximately four NVMe storage devices). As such, the use of NVMe storage devices in RAID storage subsystems present RAID storage system scaling issues, as the RAID storage controllers cannot scale with more than a few NVMe storage devices.

Accordingly, it would be desirable to provide a RAID storage system that addresses the issues discussed above.

SUMMARY

According to one embodiment, an Information Handling System (IHS) includes a first Redundant Array of Independent Disk (RAID) primary data storage device that includes a first storage subsystem storing first primary data, wherein the first RAID primary data storage device is configured, in response to a first command received from a RAID storage controller device, to: retrieve, via a first Direct Memory Access (DMA) operation from a host system, second primary data; perform an XOR operation on the first primary data in the first storage subsystem and the second primary data to produce first interim parity data; and write, via a second DMA operation to a second buffer subsystem in a RAID parity data storage device, the first interim parity data; the RAID parity data storage device that includes a second storage subsystem storing first parity data and the second buffer subsystem storing the first interim parity data and second interim parity data, wherein the RAID parity data storage device is configured, in response to a second command received from the RAID storage controller device, to: perform an XOR operation on the first parity data in the second storage subsystem and the first interim parity data in the second buffer subsystem to produce second parity data; and overwrite, in the second storage subsystem, the first parity data with the second parity data; and wherein the RAID parity data storage device is configured, in response to a third command received from the RAID storage controller device, to: perform Galois Field (GF) operations on the first interim parity data and the second interim parity data in the second buffer subsystem to produce first GF interim parity data and second GF interim parity data; perform an XOR operation on the first GF interim parity data and the second GF interim parity data to produce first interim Q data; and write, via a third DMA operation to a third buffer subsystem in a RAID Q data storage device, the first interim Q data; and the RAID Q data storage device that includes a third storage subsystem storing first Q data and the third buffer subsystem storing the first interim Q data and second interim Q data, wherein the RAID Q data storage device is configured, in response to a fourth command received from the RAID storage controller device, to: perform an XOR operation on the first interim Q data and the second interim Q data in the third buffer subsystem to produce third interim Q data; and overwrite, in the third buffer subsystem, the first interim Q data and the second interim Q data with the third interim Q data; and wherein the RAID Q data storage device is configured, in response to a fifth command received from the RAID storage controller device, to: perform an XOR operation on the first Q data in the third storage subsystem and the third interim Q data in the third buffer subsystem to produce second Q data; and overwrite, in the third storage subsystem, the first Q data with the second Q data.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
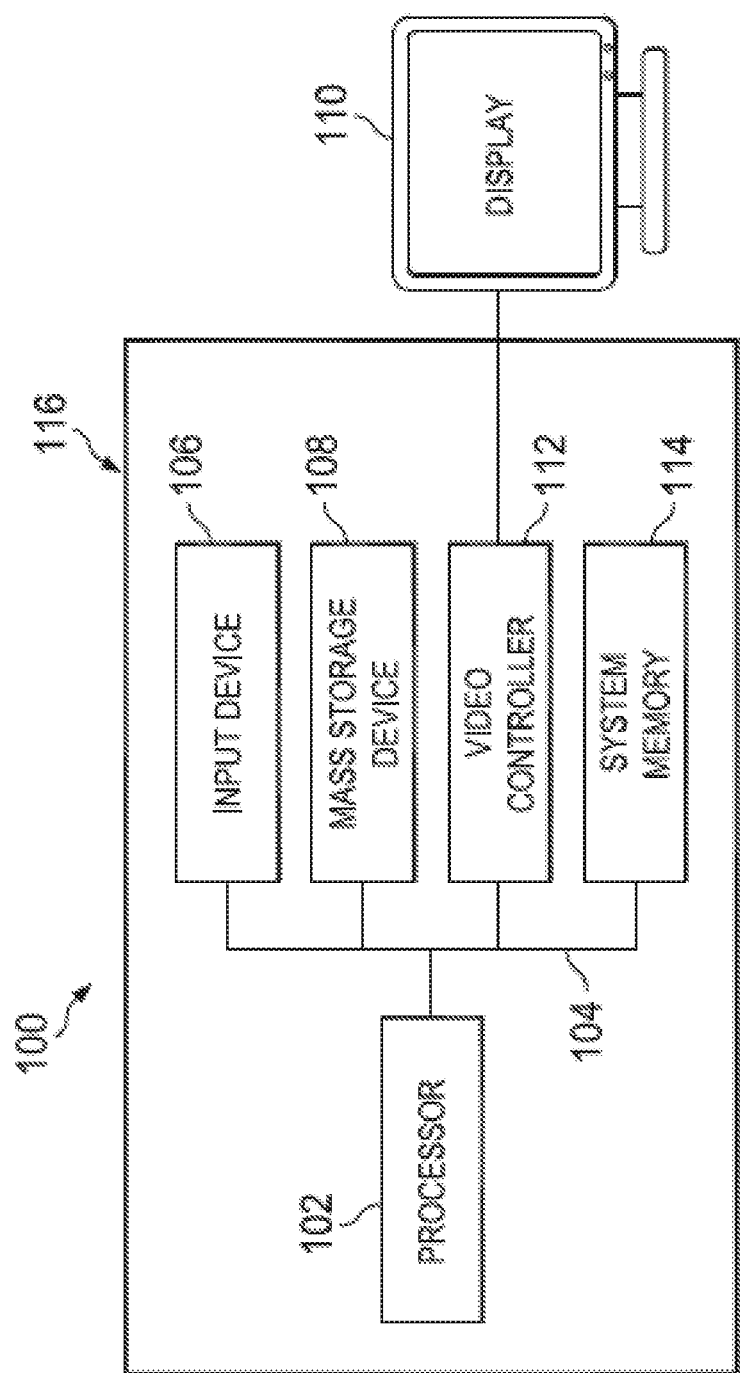
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
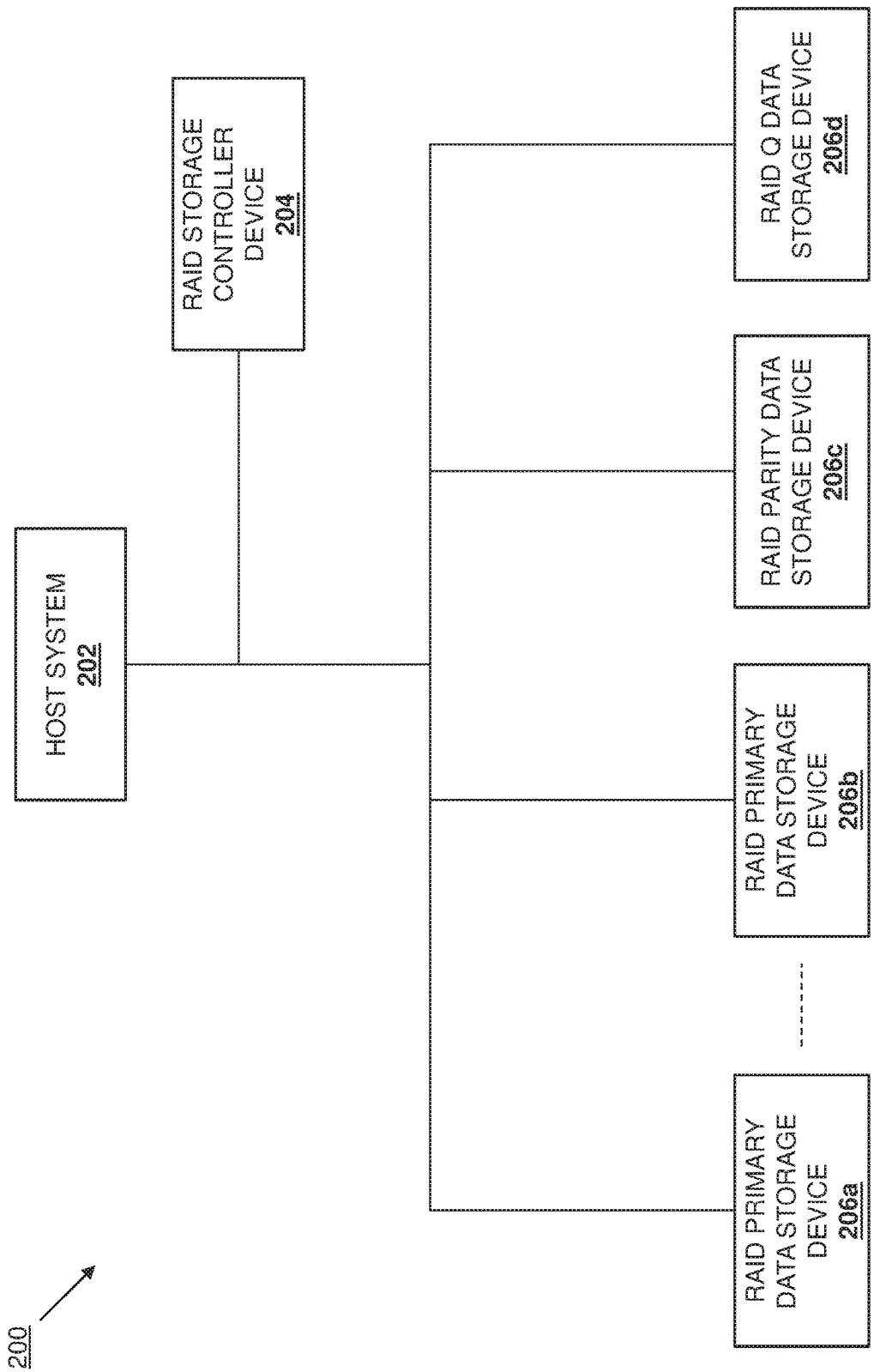
FIG. 2 is a schematic view illustrating an embodiment of a RAID storage system.

Referring now to FIG. 2, an embodiment of a Redundant Array of Independent Disks (RAID) storage system 200 is illustrated. In the illustrated embodiment, the RAID storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID storage system 200 also includes a RAID storage controller system 204 that is coupled to the host system 202 and that may be provided by the IHS 100 discussed above with reference to FIG. 1, and/or may include some or all of the components of the IHS 100. For example, the RAID controller system 204 may include any storage device/disk array controller device that is configured to manage physical storage devices and present them to host systems as logical units.

Furthermore, the RAID storage system 200 also includes a plurality of RAID storage devices that are illustrated in FIG. 2 as a plurality of RAID primary data storage devices 206a and up to 206b, a RAID parity storage data device 206c, and a RAID Q data storage device 206d, each of which is coupled to the host system 202 and the RAID storage controller system 204. As will be appreciated by one of skill in the art in possession of the present disclosure, the RAID storage device in the RAID storage system 200 of FIG. 2 are in a RAID 6 configuration, with the RAID primary data storage devices 206a and up to 206b configured to store primary data (e.g., provided by the host system 202), the RAID parity data storage device 206c configured to store parity data that may be utilized to recover primary data when that primary data becomes unavailable on a RAID primary data storage device, and the RAID Q data storage device 206c configured to store Q data that may be utilized to recover primary data when that primary data becomes unavailable on a RAID primary data storage device.

However, while a few RAID storage devices in a particular configuration are illustrated, one of skill in the art in possession of the present disclosure will recognize that many more storage devices may (and typically will) be coupled to the RAID storage controller system 204 (e.g., in a datacenter) and may be provided in other RAID configurations while remaining within the scope of the present disclosure. In the embodiments discussed below, the RAID storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
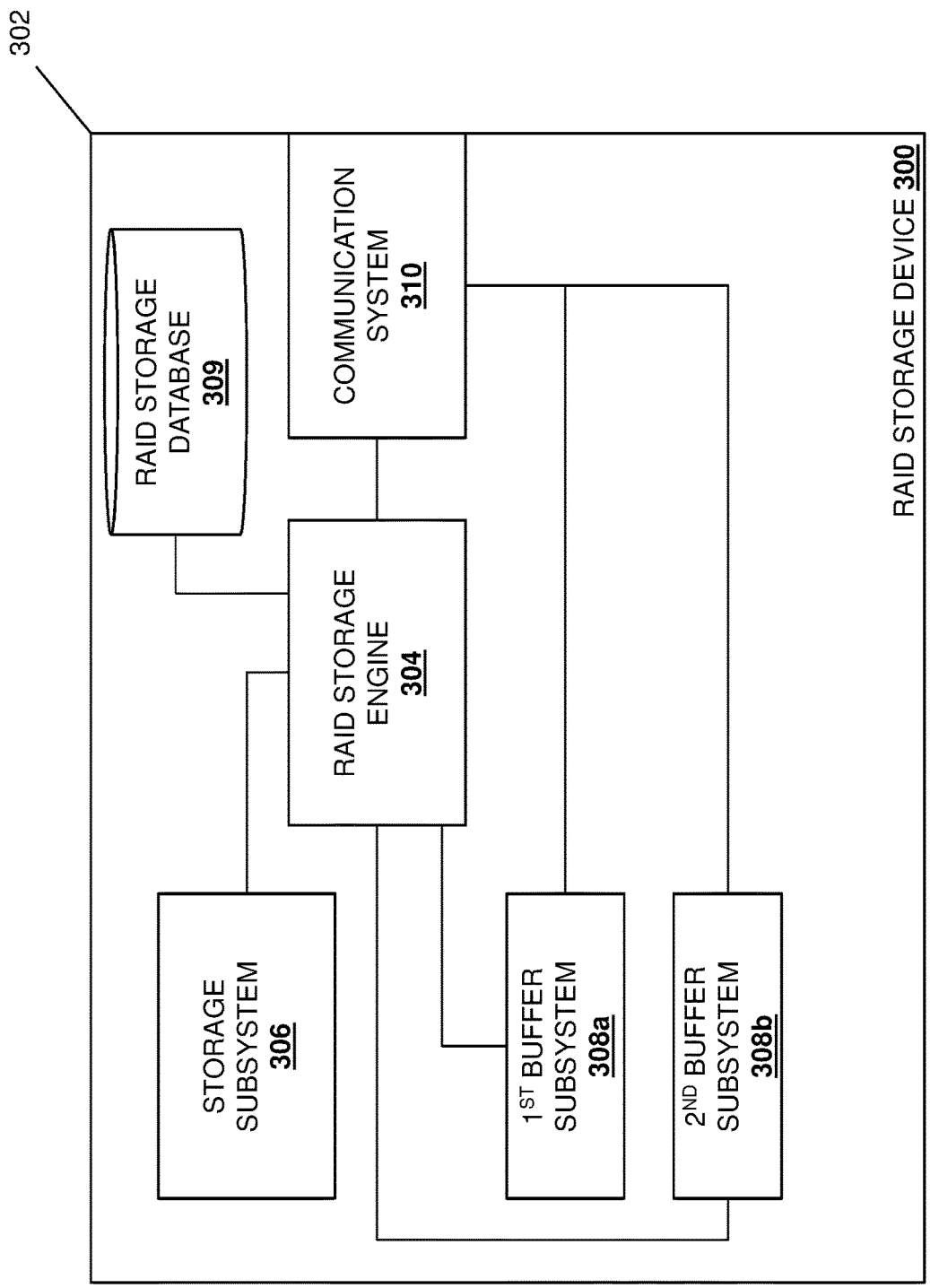
FIG. 3 is a schematic view illustrating an embodiment of a RAID storage device that may be provided in the RAID storage system of FIG. 2.

Referring now to FIG. 3, an embodiment of a RAID storage device 300 is illustrated that may provide any or all of the RAID primary data storage devices 206a-206b, the RAID parity data storage device 206c, and/or the RAID Q data storage device 206d discussed above with reference to FIG. 2. As such, the RAID storage device 300 may be provided by an NVMe SSD storage devices, but one of skill in the art in possession of the present disclosure will recognize that other types of storage devices with similar functionality as the NVMe SSD storage devices (e.g., NVMe PCIe add-in cards, NVMe M.2 cards, etc.) may be implemented according to the teachings of the present disclosure and thus will fall within its scope as well. In the illustrated embodiment, the RAID storage device 300 includes a chassis 302 that houses the components of the RAID storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID storage devices discussed below. While not illustrated, one of skill in the art in possession of the present disclosure will recognize that the RAID storage engine 304 may include, or be coupled to, other components such as a queues (e.g., the submission queues and completion queues discussed below) and/or RAID storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a buffer system 308 that includes a first buffer subsystem 308a that is coupled to the RAID storage engine 304 (e.g., via a coupling between the first buffer subsystem 308a and the processing system), and a second buffer subsystem 308b that is coupled to the RAID storage engine 304 (e.g., via a coupling between the second buffer subsystem 308b and the processing system). For example, the buffer system 308 may be provided by one or more buffer memory devices that include a first set of memory address ranges that provide the first buffer subsystem 308a, and a second set of memory address ranges that provide the second buffer subsystem 308b. Continuing with the example provided above in which the RAID storage device 300 is an NVMe SSD storage device, the first buffer subsystem 308a may be provided by a portion of the buffer system 308 that is often referred to as the "device buffer". However, one of skill in the art in possession of the present disclosure will recognize that the first buffer subsystem 308a may be provided using other buffer technologies while remaining within the scope of the present disclosure as well.

Similarly, continuing with the example provided above in which the RAID storage device 300 is an NVMe SSD storage device, the second buffer subsystem 308b may be provided by a portion of the buffer system 308 that is often referred to as the "Controller Memory Buffer (CMB)", "scratchpad buffer", or "cache buffer". In an embodiment, the second buffer subsystem 308b/CMB may be provided by a subset of the buffer system 308 that is distinguished from the first buffer subsystem 308a/device buffer. For example, the second set of memory address ranges in the buffer memory device(s) that provide the second buffer subsystem 308b/CMB may be mapped to the PCIe memory space of the host system 202, which one of skill in the art in possession of the present disclosure will recognize makes the second buffer subsystem 308b/CMB visible to the host system 202 while the rest of the buffer system 308 (e.g., the first buffer subsystem 308a/device buffer) is not (i.e., due to the first set of memory address ranges in the buffer memory device(s) that provide the first buffer subsystem 308a/device buffer not being mapping to the PCIe memory space of the host system 202.) As will be appreciated by one of skill in the art in possession of the present disclosure, mapping the second buffer subsystem 308b/CMB to the PCIe memory space of the host system 202 allows for the second buffer subsystem 308b/CMB to be the target of the Direct Memory Access (DMA) data operation discussed below. However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to storage any of the information utilized by the RAID storage engine 304 as discussed below.

The chassis 302 may also house a communication system 310 that is coupled to the RAID storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID storage device 300 is an NVMe SSD storage device, the communication system 310 may include any NVMe SSD storage device communication components that enable the Direct Memory Access (DMA) operations described below, as well as any other NVMe SDD storage device communication functionality that would be apparent to one of skill in the art in possession of the present disclosure. While a specific RAID storage device 300 has been illustrated, one of skill in the art in possession of the present disclosure will recognize that RAID storage devices (or other devices operating according to the teachings of the present disclosure in a manner similar to that described below for the RAID storage device 300) may include a variety of components and/or component configurations for providing conventional RAID storage device functionality, as well as the functionality discussed below, while remaining within the scope of the present disclosure as well.

Figure 4A:
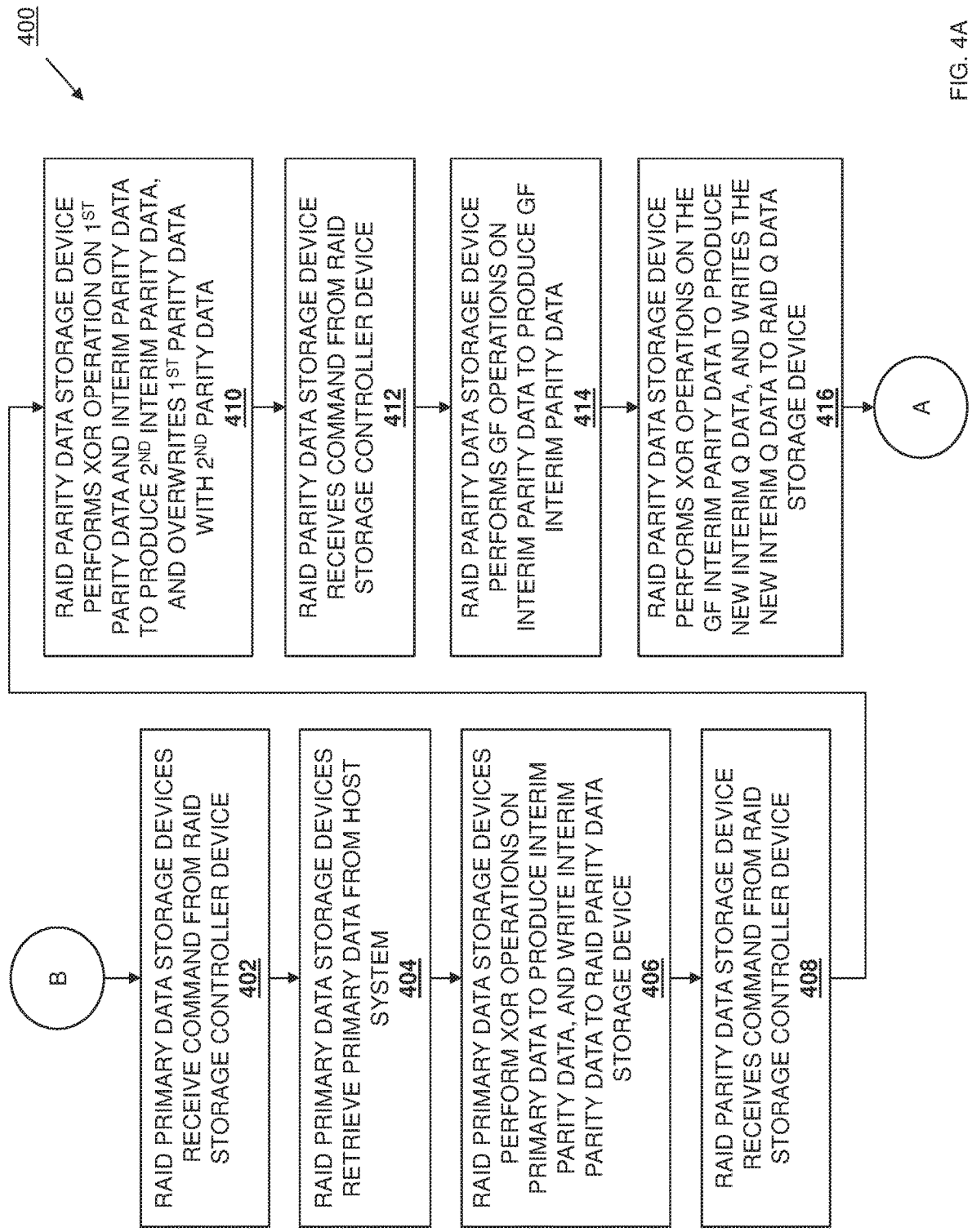
FIG. 4A is a flow chart illustrating an embodiment of a portion of a method for assisting with deferred Q data determination operations using RAID storage devices.
Figure 4B:
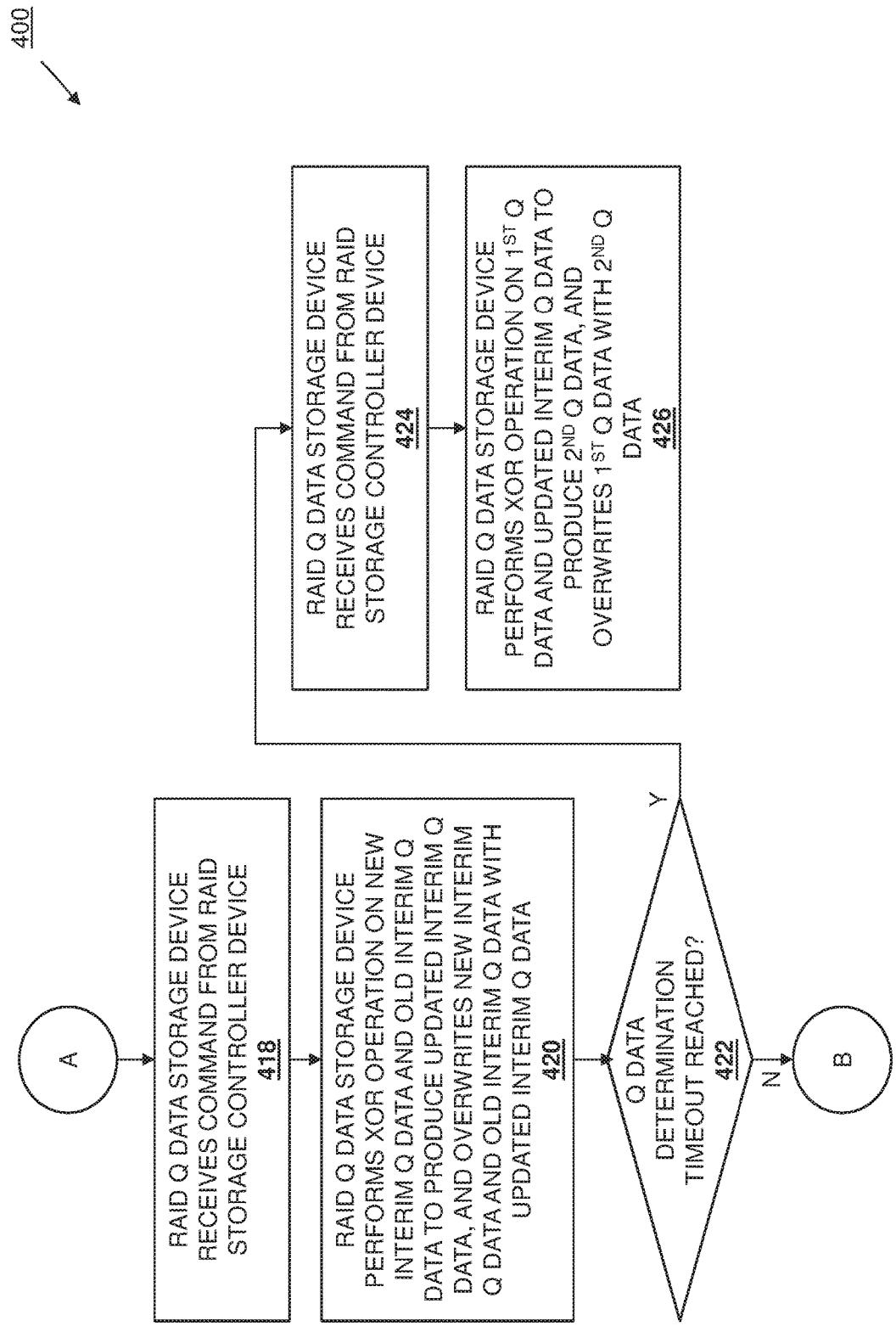
FIG. 4B is a flow chart illustrating an embodiment of a portion of a method for assisting with deferred Q data determination operations using RAID storage devices.

Referring now to FIGS. 4A and 4B, an embodiment of a method 400 for assisting with deferred Q data determination operations using RAID storage devices is illustrated. As discussed below, the systems and methods of the present disclosure provide for the performance of deferred Q data determination operations to backup data in a RAID storage system with the assistance of the RAID storage devices that store that data. For example, a RAID primary data storage device may receive a command from a RAID storage controller device and, in response, may retrieve second primary data from a host system via a first Direct Memory Access (DMA) operation, perform an XOR operation on first primary data in a first storage subsystem in the first RAID primary data storage device and the second primary data to produce first interim parity data, and write the first interim parity data to a second buffer subsystem in a RAID parity data storage device via a second DMA operation. The RAID parity data storage device may then receive a second command from the RAID storage controller device and, in response, may perform an XOR operation on first parity data in a second storage subsystem in the RAID parity data storage device and the first interim parity data in the second buffer subsystem to produce second parity data, and overwrite the first parity data with the second parity data in the second storage subsystem.

The RAID parity data storage device may then receive a third command from the RAID storage controller device and, in response, may perform Galois Field (GF) operations on the first interim parity data and second interim parity data in the second buffer subsystem to produce first GF interim parity data and second GF interim parity data, perform an XOR operation on the first GF interim parity data and the second GF interim parity data to produce new interim Q data, and write the new interim Q data to a third buffer subsystem in a RAID Q data storage device that already stores old interim Q data. The RAID Q data storage device may then receive a fourth command from the RAID storage controller device and, in response, may perform an XOR operation on the new interim Q data and the old interim Q data in the third buffer subsystem to produce updated interim Q data, and overwrite the new interim Q data and the old interim Q data with the updated interim Q data in the third buffer subsystem. Any updated interim Q data provided in the third buffer subsystem in such a manner becomes the old interim Q data on subsequent iterations of the method, and as long as a Q data determination timeout is not reached, the method may loop multiple times to produce and write updated interim Q data to the third buffer subsystem. In the event the Q data determination timeout is reached, the RAID Q data storage device may perform an XOR operation on first Q data in a storage subsystem in the RAID Q data storage subsystem and the updated Q data in the third buffer subsystem to produce second Q data, and overwrite the first Q data with the second Q data. As such, Q data determinations may be deferred, and the deferral of those Q data determination operations are offloaded from the RAID storage controller device, thus increasing the ability of the RAID storage controller device to scale with high performance RAID storage devices.

Figure 5:
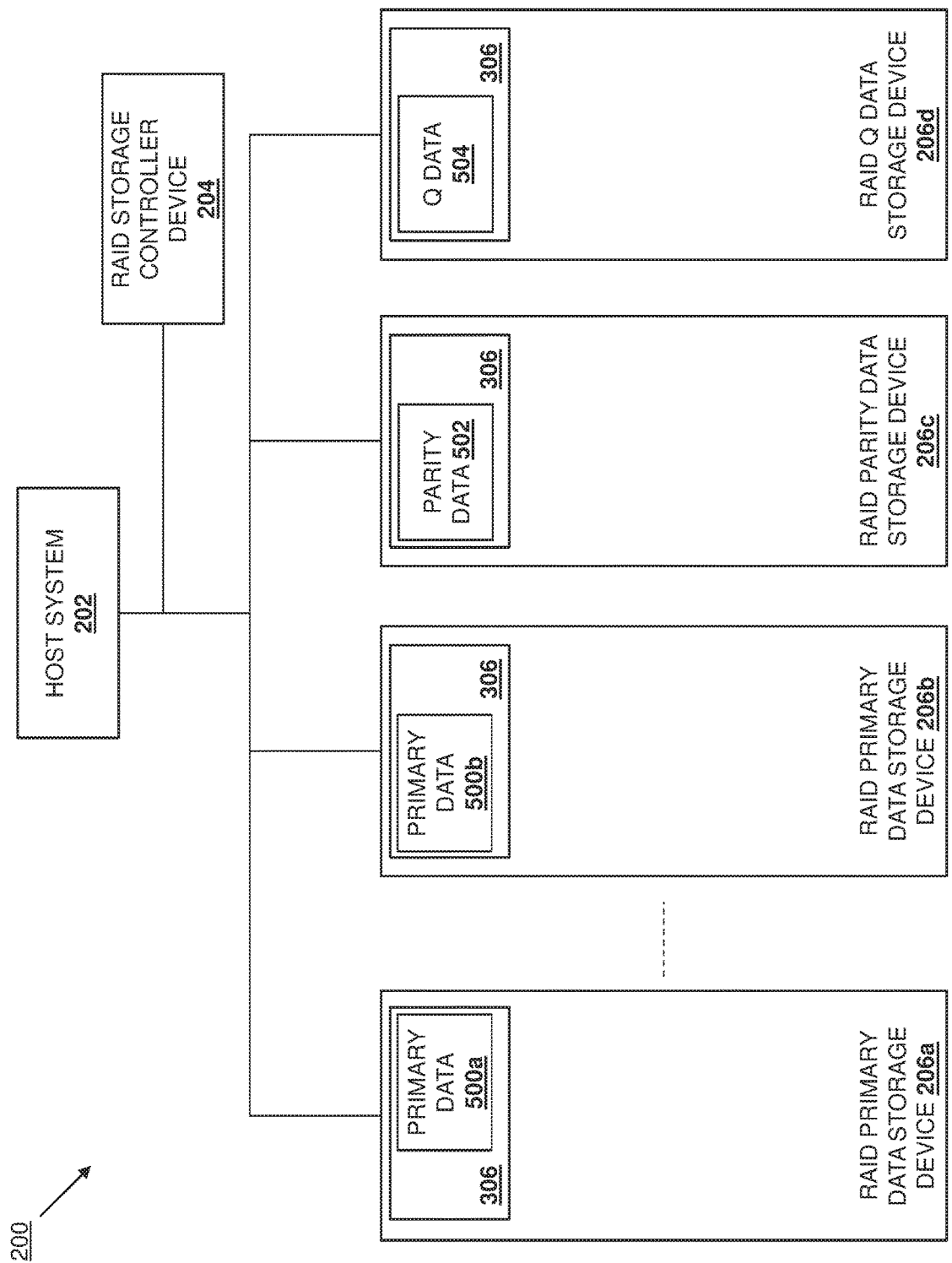
FIG. 5 is a schematic view illustrating an embodiment of the RAID storage system of FIG. 2 operating during the method of FIGS. 4A and 4B.

With reference to FIG. 5, the RAID storage system 200 is illustrated with the RAID primary storage device 206a storing primary data 500a in its storage subsystem 306, and the RAID primary data storage device 206b storing primary data 500b in its storage subsystem 306. While only two RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206c storing parity data 502 in its storage subsystem 306, and one of skill in the art in possession of the present disclosure will recognize that the parity data 502 may have been generated via an XOR operation performed on the primary data 500a-500b in the RAID primary data storage devices 206a-206b, and allows for the rebuilding of any primary data stored on any one RAID primary data storage device in the event that primary data/RAID primary data storage device becomes unavailable.

Furthermore, the RAID storage system 200 is also illustrated with the RAID Q data storage device 206c storing Q data 504 in its storage subsystem 306, and one of skill in the art in possession of the present disclosure will recognize that the Q data 504 may have been generated via Galois Field (GF) and XOR operations performed on the primary data 500a-500b in the RAID primary data storage devices 206a-206c, and allows for the rebuilding of any primary data, and in some cases parity data, stored on any two RAID storage devices (e.g., RAID primary data storage device(s) 206A0206B and, in some cases, the RAID parity data storage device 206C) in the event that data/those RAID storage devices become unavailable. As will also be appreciated by one of skill in the art in possession of the present disclosure, the primary/parity/Q data storage configuration illustrated in FIG. 5 provides primary/parity/Q data for a single data stripe, and different data stripes may have different primary/parity/Q data storage configurations (e.g., in a plurality of RAID storage devices provided in a RAID storage system, a first data stripe may include primary data on first and second RAID storage device, parity data on a third RAID storage device, and Q data on a fourth RAID storage device; a second data stripe may include primary data on the second and third RAID storage device, parity data on the fourth RAID storage device, and Q data on the first RAID storage device; a third data stripe may include primary data on the third and fourth RAID storage device, parity data on the first RAID storage device, and Q data on the second RAID storage device, etc.) As such, while a particular RAID storage system device and data configuration is illustrated for purposes of the examples below, one of skill in the art in possession of the present disclosure will recognize that a variety of device and data configurations will fall within the scope of the present disclosure as well.

Figure 6A:
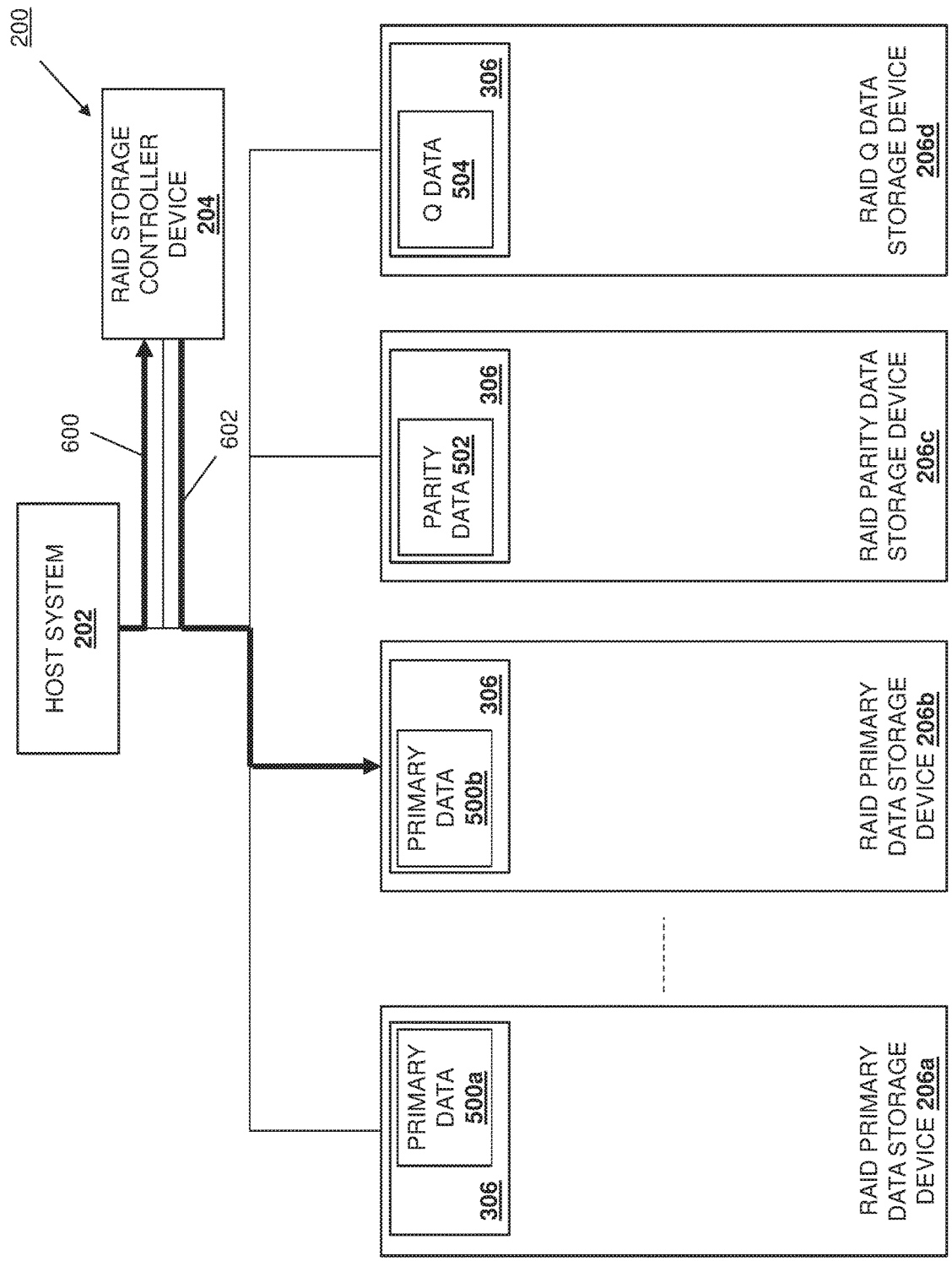
FIG. 6A is a schematic view illustrating an embodiment of the RAID storage system of FIG. 2 operating during the method of FIGS. 4A and 4B.

The method 400 begins at block 402 where RAID primary data storage devices receive a command from a RAID storage controller device. In an embodiment, at block 402, the RAID storage controller device 204 may generate and transmit a command to a RAID primary data storage device. With reference to FIG. 6A, the host system 202 may generate a write command 600 that instructs the writing of primary data that is located on the host system 200 to the RAID primary data storage devices 206a-206b, and may transmit that write command 600 to the RAID storage controller device 204. As will be appreciated by one of skill in the art in possession of the present disclosure, the generation and/or transmission of the write command 600 by the host system 202 to the RAID storage controller device 204 at block 402 may include a variety of control plane communications between the host system 202 and the RAID storage controller device 204 that have been omitted for clarity of discussion. As such, at block 402, the RAID storage controller device 204 may receive the write command 600 and, in response to that write command 600, may generate a command 602 and transmit the command 602 to the RAID primary data storage device 206b.

In some embodiments, the command 602 may be a multi-operation command like those described in U.S. patent application Ser. No. 16/585,296, filed on Sep. 27, 2019. For example, the command 602 may be an NVMe WRITE WITH XOR multi-operation command that is configured to cause the RAID primary data storage device 206b to perform the multiple operations described below. However, while described as providing a multi-operation command at block 402, one of skill in the art in possession of the present disclosure will recognize that the multiple operations performed by the RAID primary data storage device 206b discussed below may be performed in response to respective commands transmitted by the RAID storage controller device 204 while remaining within the scope of the present disclosure as well. In a specific example, the transmission of the command 602 may include the RAID storage controller device 204 providing the command 602 in a submission queue that is included in the communication system 310 in the RAID primary data storage device 206b/300, and then ringing a doorbell for the RAID primary data storage device 206b/300. However, one of skill in the art in possession of the present disclosure will recognize that the command 602 may be provided to the RAID primary data storage device 206b in a variety of manners that will fall within the scope of the present disclosure as well.

As such, in some examples the RAID storage engine 304 in the RAID primary data storage device 206b/300 may respond to the ringing of its doorbell by accessing the command 602 in the submission queue in its communication system 310. In embodiments in which the command 602 is a multi-operation command, the RAID storage engine 304 in the RAID primary data storage device 206b/300 may identify the multiple operations instructed by that command 602 (as described in U.S. patent application Ser. No. 16/585,296, filed on Sep. 27, 2019.) However, while a single RAID primary data storage device is illustrated and described below as receiving the command 602 that causes it to update its primary data 500b, one of skill in the art in possession of the present disclosure will recognize how multiple RAID primary storage devices may receive similar commands at block 402 while remaining within the scope of the present disclosure as well.

Figure 6B:
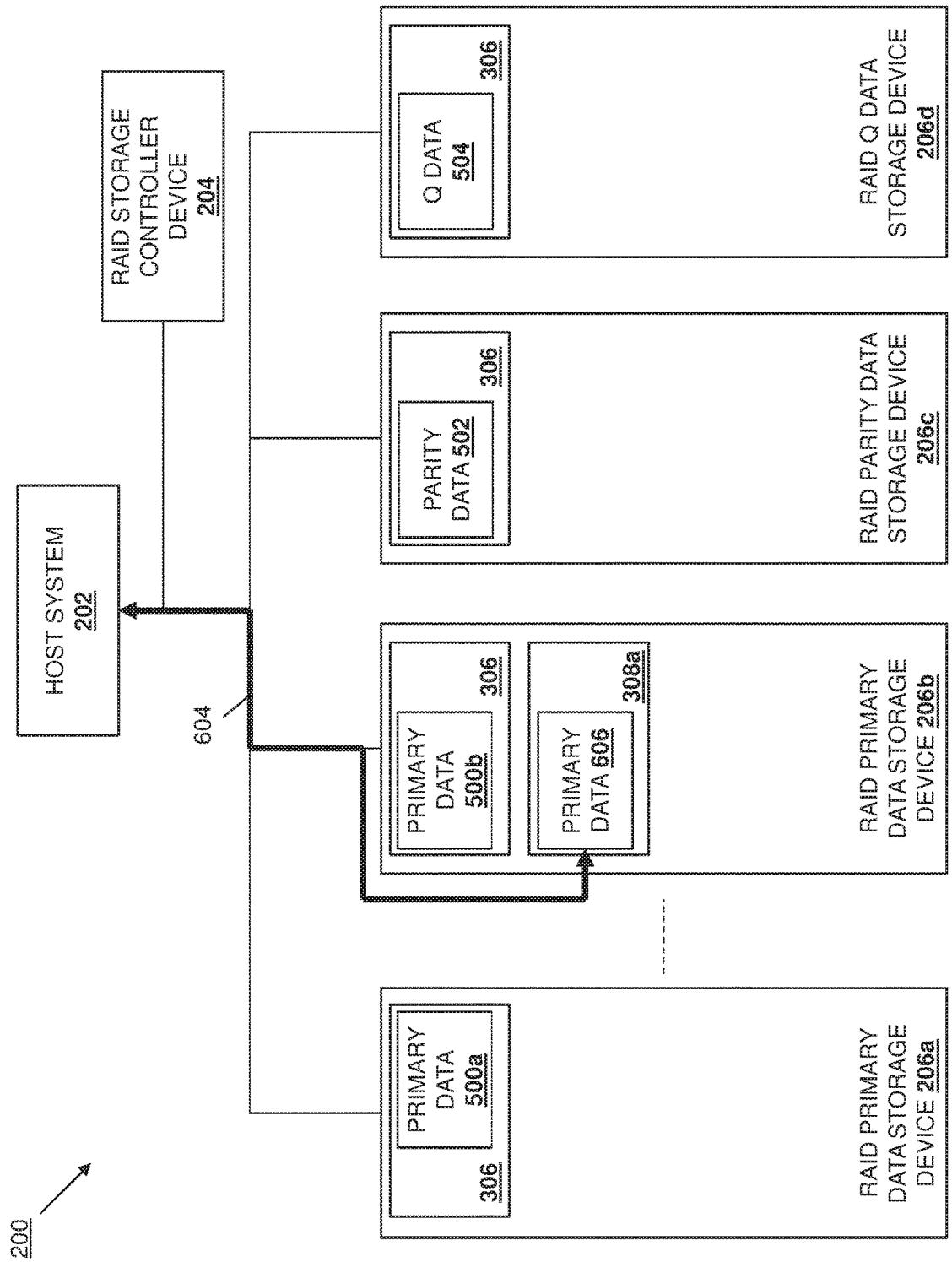
FIG. 6B is a schematic view illustrating an embodiment of the RAID storage system of FIG. 2 operating during the method of FIGS. 4A and 4B.

The method 400 then proceeds to block 404 where the RAID primary data storage devices retrieve primary data from a host system. With reference to FIG. 6B, in an embodiment of block 404 and based on the command 602 (which is a multi-operation command as described above in this embodiment), the RAID storage engine 304 in the RAID primary data storage device 206b/300 may operate to perform a Direct Memory Access (DMA) operation 604 that accesses primary data 606 that is stored on the host system 220 (e.g., in a memory system or storage system included on the host system 202) and writes that primary data 606 to its first buffer subsystem 308a (e.g., in a device buffer in the RAID primary data storage device 206b as described in the example above). As will be appreciated by one of skill in the art in possession of the present disclosure, the primary data 606 may be an update to the primary data 500b stored in the storage subsystem 306 in the RAID primary data storage device 206b, although other primary data writing scenarios will fall within the scope of the present disclosure as well.

Figure 6C:
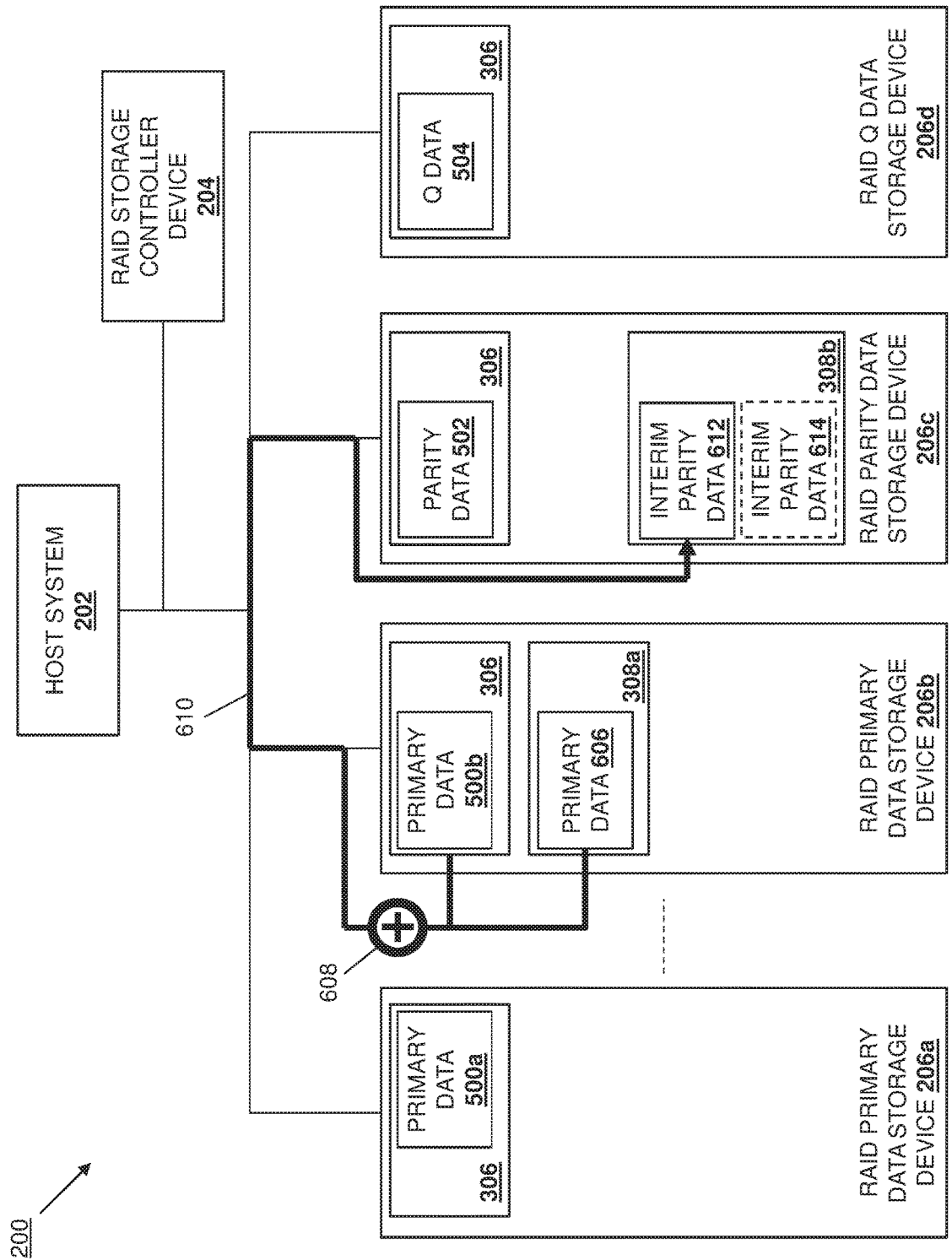
FIG. 6C is a schematic view illustrating an embodiment of the RAID storage system of FIG. 2 operating during the method of FIGS. 4A and 4B.

The method 400 then proceeds to block 406 where the RAID primary data storage devices perform XOR operations on primary data to produce interim parity data, and write the interim parity data to a RAID parity data storage device. With reference to FIG. 6C, in an embodiment of block 406 and based on the command 602 (which is a multi-operation command as described above in this embodiment), the RAID storage engine 304 in the RAID primary data storage device 206b/300 may operate to perform an XOR operation 608 using the primary data 500b in its storage subsystem 306 and the primary data 606 in its first buffer subsystem 308a in order to produce interim parity data 612, and then perform a DMA operation 610 that writes that interim parity data 612 to the second buffer subsystem 308b (e.g., a CMB) in the RAID parity data storage device 206c.

Figure 6D:
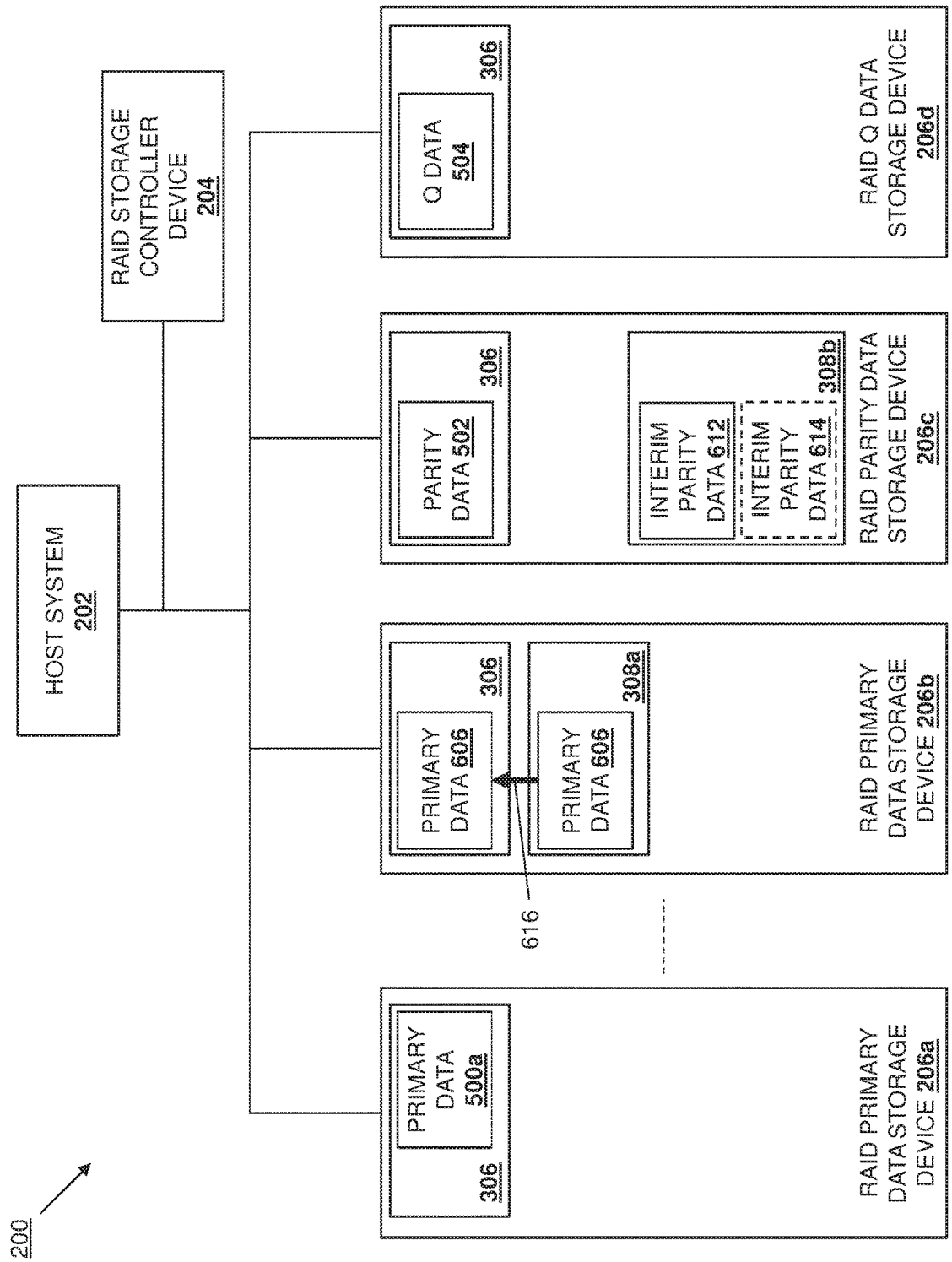
FIG. 6D is a schematic view illustrating an embodiment of the RAID storage system of FIG. 2 operating during the method of FIGS. 4A and 4B.

Furthermore, FIG. 6C illustrates how the RAID parity data storage device 206c may store additional interim parity data 614 in its second buffer subsystem 308b. For example, if a write (or WRITE WITH XOR multi-operation command) spans multiple RAID primary data storage devices, each of those RAID primary data storage devices may provide respective interim parity data in a manner that is substantially similar to that described for the RAID primary data storage device 206b above. In the examples below, the interim parity data 612 and 614 is utilized during the method 400, and one of skill in the art in possession of the present disclosure will recognize that such interim parity data may be generated by any RAID primary data storage device that experiences an update to its primary data in a manner similar to that described above for the RAID primary data storage device 206b. Further still, FIG. 6D illustrates how the RAID storage engine 304 in the RAID parity data storage device 206c may perform an overwrite operation 616 to overwrite the primary data 500b in its storage subsystem 306 with the primary data 606 in its first buffer subsystem 308a based on the command 602 (which is a multi-operation command as described above in this embodiment), thus updating that primary data stored by the RAID primary data storage device 206b. One of skill in the art in possession of the present disclosure will recognize how RAID primary data storage devices experiencing similar primary data updates may perform similar primary data overwriting operations while remaining within the scope of the present disclosure as well.

Figure 6E:
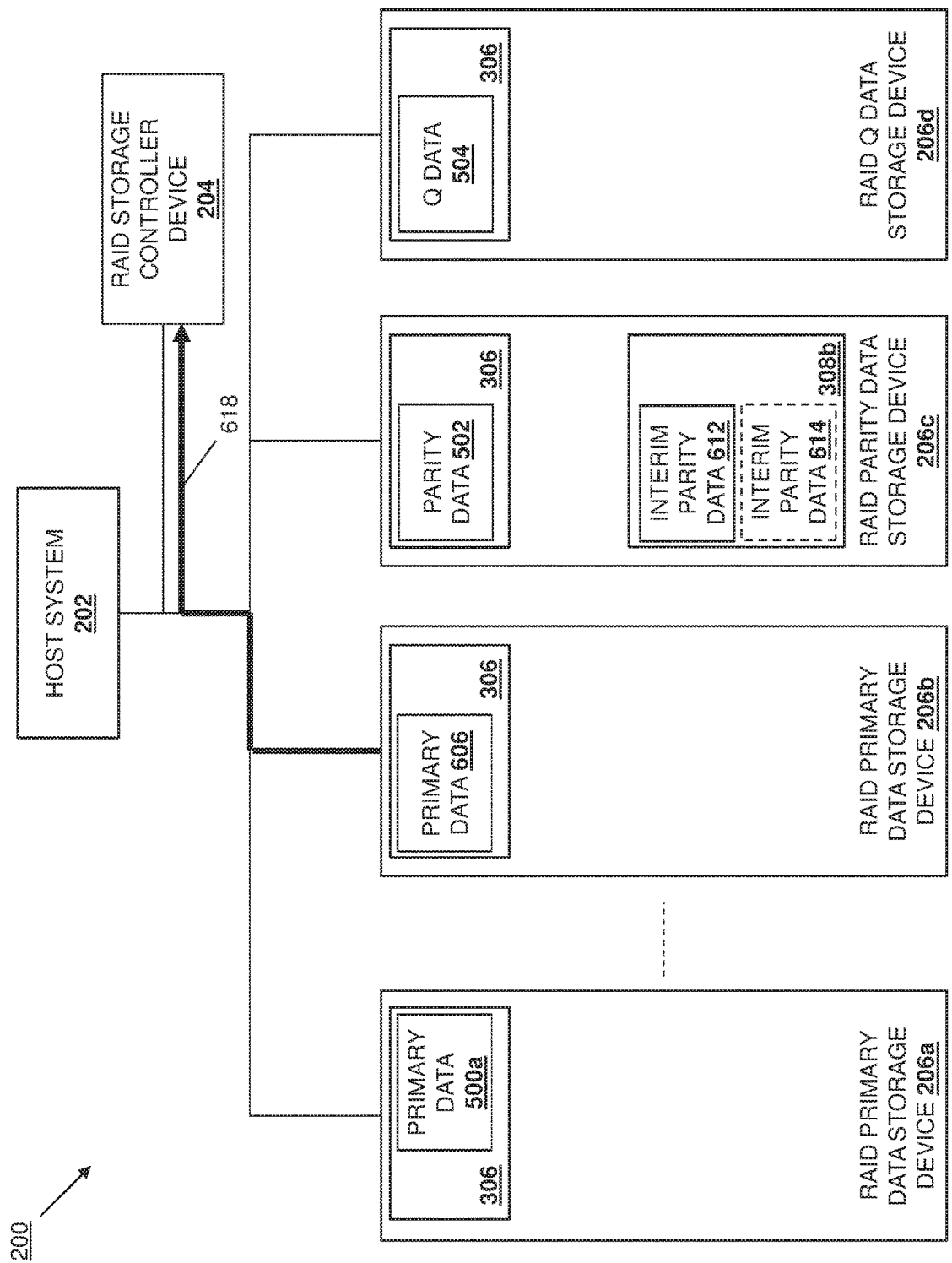
FIG. 6E is a schematic view illustrating an embodiment of the RAID storage system of FIG. 2 operating during the method of FIGS. 4A and 4B.

With reference to FIG. 6E, following completion of the operations associated with the command 602 (e.g., multiple operations associated with a multi-operation command as discussed above, following each operation associated with respective commands, etc.) the RAID storage engine 304 in the RAID primary data storage device 206b/300 may generate and transmit a completion message 618 to the RAID storage controller device 204. For example, the RAID storage engine 304 in the RAID primary data storage device 206b/300 may generate the completion message 618 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. Furthermore, one of skill in the art in possession of the present disclosure will recognize that other RAID primary data storage devices experiencing similar primary data updates (as discussed above) may transmit similar completion messages to the RAID storage controller device 204 following their update operations (e.g., the multiple operations in the WRITE WITH XOR multi-operation command discussed above), and the RAID storage controller device 204 may wait to receive completion messages from each RAID primary data storage device experiencing an update prior to proceeding with the method 400.

The method 400 then proceeds to block 408 where the RAID parity data storage device receives a command from the RAID storage controller device. In an embodiment, at block 408, the RAID storage controller device 204 may generate and transmit a command to a RAID parity data storage device. For example, and as discussed above, the RAID storage controller device 204 may determine that completion messages from each RAID primary data storage device experiencing an update have been received as discussed above and, in response, at block 404 the RAID storage controller device 204 may generate a command 700 and transmit the command 700 to the RAID parity data storage device 206c.

Similarly as discussed above, the command 700 may be a multi-operation command like those described in U.S. patent application Ser. No. 16/585,296, filed on Sep. 27, 2019. For example, the command 700 may be an NVMe WRITE PARITY multi-operation command that is configured to cause the RAID parity data storage device 206c to perform the multiple operations described below. However, while described as providing a multi-operation command at block 408, one of skill in the art in possession of the present disclosure will recognize that the multiple operations performed by the RAID parity data storage device 206c discussed below may be performed in response to respective commands transmitted by the RAID storage controller device 204 while remaining within the scope of the present disclosure as well. In a specific example, the transmission of the command 700 may include the RAID storage controller device 204 providing the command 700 in a submission queue that is included in the communication system 310 in the RAID parity data storage device 206c/300, and then ringing a doorbell for the RAID parity data storage device 206c/300. However, one of skill in the art in possession of the present disclosure will recognize that the command 700 may be provided to the RAID parity data storage device 206c in a variety of manners that will fall within the scope of the present disclosure as well.

As such, in some examples the RAID storage engine 304 in the RAID parity data storage device 206c/300 may respond to the ringing of its doorbell by accessing the command 700 in the submission queue in its communication system 310. In embodiments in which the command 700 is a multi-operation command, the RAID storage engine 304 in the RAID parity data storage device 206c/300 may identify the multiple operations instructed by that command 700 (as described in U.S. patent application Ser. No. 16/585,296, filed on Sep. 27, 2019.)

Figure 7A:
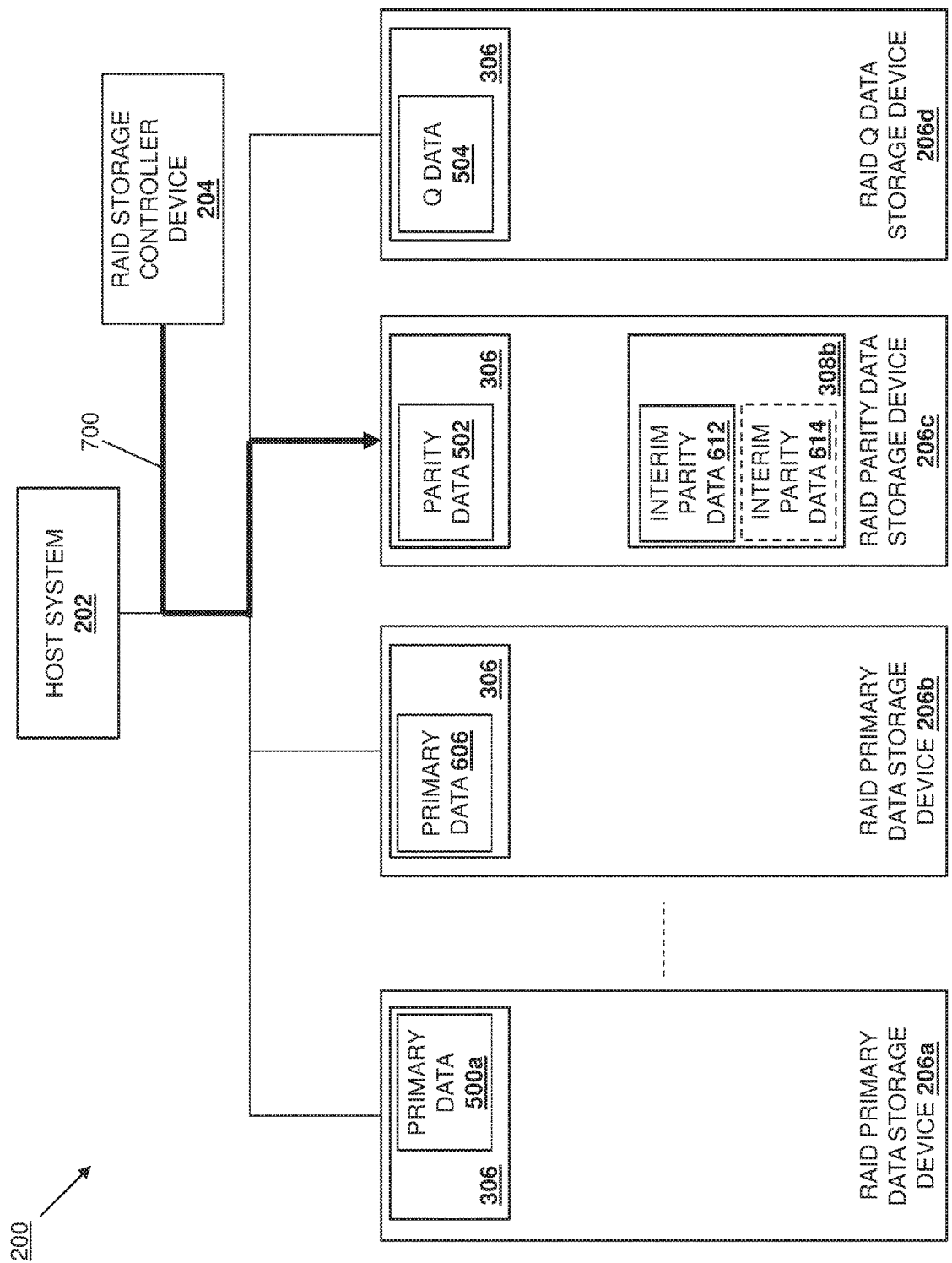
FIG. 7A is a schematic view illustrating an embodiment of the RAID storage system of FIG. 2 operating during the method of FIGS. 4A and 4B.
Figure 7B:
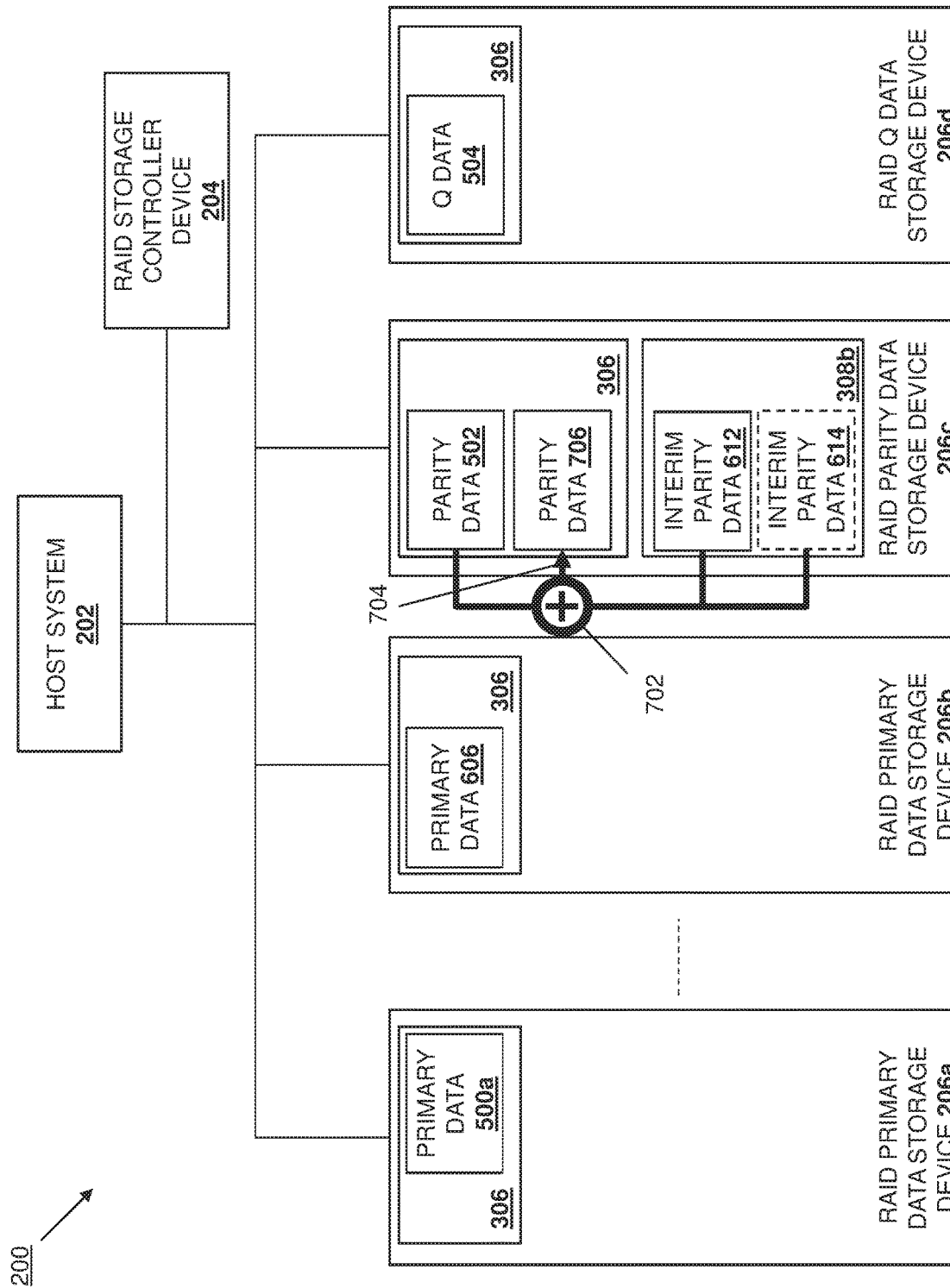
FIG. 7B is a schematic view illustrating an embodiment of the RAID storage system of FIG. 2 operating during the method of FIGS. 4A and 4B.

The method 400 then proceeds to block 410 where the RAID parity data storage device performs an XOR operation on first parity data and interim parity data to produce second parity data, and overwrites the first parity data with the second parity data. With reference to FIG. 7B, in an embodiment of block 410 and based on the command 700 (which is a multi-operation command as described above in this embodiment), the RAID storage engine 304 in the RAID parity data storage device 206c/300 may operate to perform an XOR operation 702 using the parity data 502 in its storage subsystem 306 and the interim parity data 612 and 614 in its second buffer subsystem 308b (e.g., a CMB) in order to produce parity data 706, and then perform an overwrite operation 704 to overwrite the parity data 502 with the parity data 706 in its storage subsystem 306 (as illustrated by the replacement of parity data 502 from FIG. 7B with parity data 606 in FIG. 7C.) As will be appreciated by one of skill in the art in possession of the present disclosure, the XOR operation 702 performed using the interim parity data 612 and 614 stored in the second buffer subsystem 308b may include any interim parity data provided by any RAID primary data storage device experiencing a primary data update as discussed above.

Figure 7C:
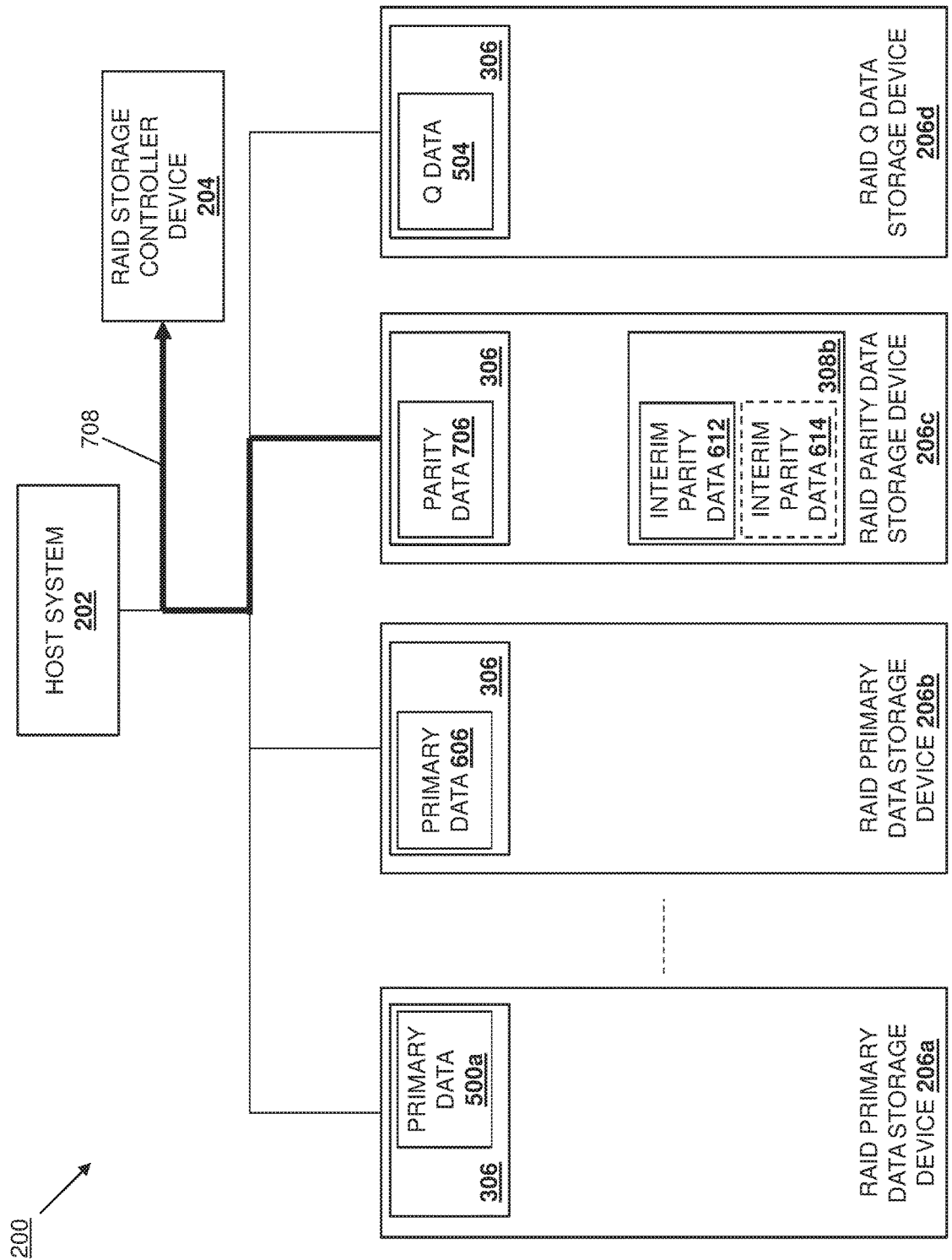
FIG. 7C is a schematic view illustrating an embodiment of the RAID storage system of FIG. 2 operating during the method of FIGS. 4A and 4B.

With reference to FIG. 7C, following completion of the operations associated with the command 700 (e.g., multiple operations associated with a multi-operation command as discussed above, following each operation associated with respective commands, etc.) the RAID storage engine 304 in the RAID parity data storage device 206c/300 may generate and transmit a completion message 708 to the RAID storage controller device 204. For example, the RAID storage engine 304 in the RAID parity data storage device 206c/300 may generate the completion message 708 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure.

The method 400 then proceeds to block 412 where the RAID parity data storage device receives a command from the RAID storage controller device. In an embodiment, at block 412, the RAID storage controller device 204 may generate and transmit a command to a RAID parity data storage device. For example, the RAID storage controller device 204 may determine that the completion message 708 was received from the RAID parity data storage device 206c as discussed above and, in response, at block 412 the RAID storage controller device 204 may generate a command 800 and transmit the command 800 to the RAID parity data storage device 206c.

Similarly as discussed above, the command 800 may be a multi-operation command like those described in U.S. patent application Ser. No. 16/585,296, filed on Sep. 27, 2019. For example, the command 800 may be an NVMe GENERATE Q multi-operation command that is configured to cause the RAID parity data storage device 206c to perform the multiple operations described below. However, while described as providing a multi-operation command at block 412, one of skill in the art in possession of the present disclosure will recognize that the multiple operations performed by the RAID parity data storage device 206c discussed below may be performed in response to respective commands transmitted by the RAID storage controller device 204 while remaining within the scope of the present disclosure as well. In a specific example, the transmission of the command 800 may include the RAID storage controller device 204 providing the command 800 in the submission queue that is included in the communication system 310 in the RAID parity data storage device 206c/300, and then ringing a doorbell for the RAID parity data storage device 206c/300. However, one of skill in the art in possession of the present disclosure will recognize that the command 800 may be provided to the RAID parity data storage device 206c in a variety of manners that will fall within the scope of the present disclosure as well.

As such, in some examples the RAID storage engine 304 in the RAID parity data storage device 206c/300 may respond to the ringing of its doorbell by accessing the command 800 in the submission queue in its communication system 310. In embodiments in which the command 800 is a multi-operation command, the RAID storage engine 304 in the RAID parity data storage device 206c/300 may identify the multiple operations instructed by that command 800 (as described in U.S. patent application Ser. No. 16/585,296, filed on Sep. 27, 2019.)

The method 400 then proceeds to block 416 where the RAID parity data storage device performs Galois Field (GF) operations on the primary data to produce GF primary data. In some embodiments, the command 900 may include an index into a log table and an inverse log table that provides for the retrieval of GF multiplicands and GF results, respectively. For example, the RAID storage engine 304 in the RAID parity data storage device 206c/300 may access an index into a log table that is located in the RAID storage database 309 in the RAID parity data storage device 206c/300 and that includes respective drive multiplicands used with GF operations, and use that index to retrieve GF multiplicands (e.g., gfLg, gfiLg, etc.) for use in performing GF operations that one of skill in the art in possession of the present disclosure would recognize are commonly utilized with RAID 6 configurations. As will be appreciated by one of skill in the art in possession of the present disclosure, the RAID storage engine 304 in the RAID parity data storage device 206c/300 may also access the index into an inverse log table that is located in the RAID storage database 309 in the RAID parity data storage device 206c/300 and that references final values derived from GF operations. The generation of such GF multiplicands and inverse log tables is outside the scope of the present disclosure, but one of skill in the art in possession of the present disclosure will recognize how an inverse log table with such GF multiplicands may be generated for the RAID storage system 200 while remaining within the scope of the present disclosure. Furthermore, while particular GF operations are illustrated and described herein, one of skill in the art in possession of the present disclosure will recognize that other operations may be performed at block 416 while remaining within the scope of the present disclosure as well.

Figure 8A:
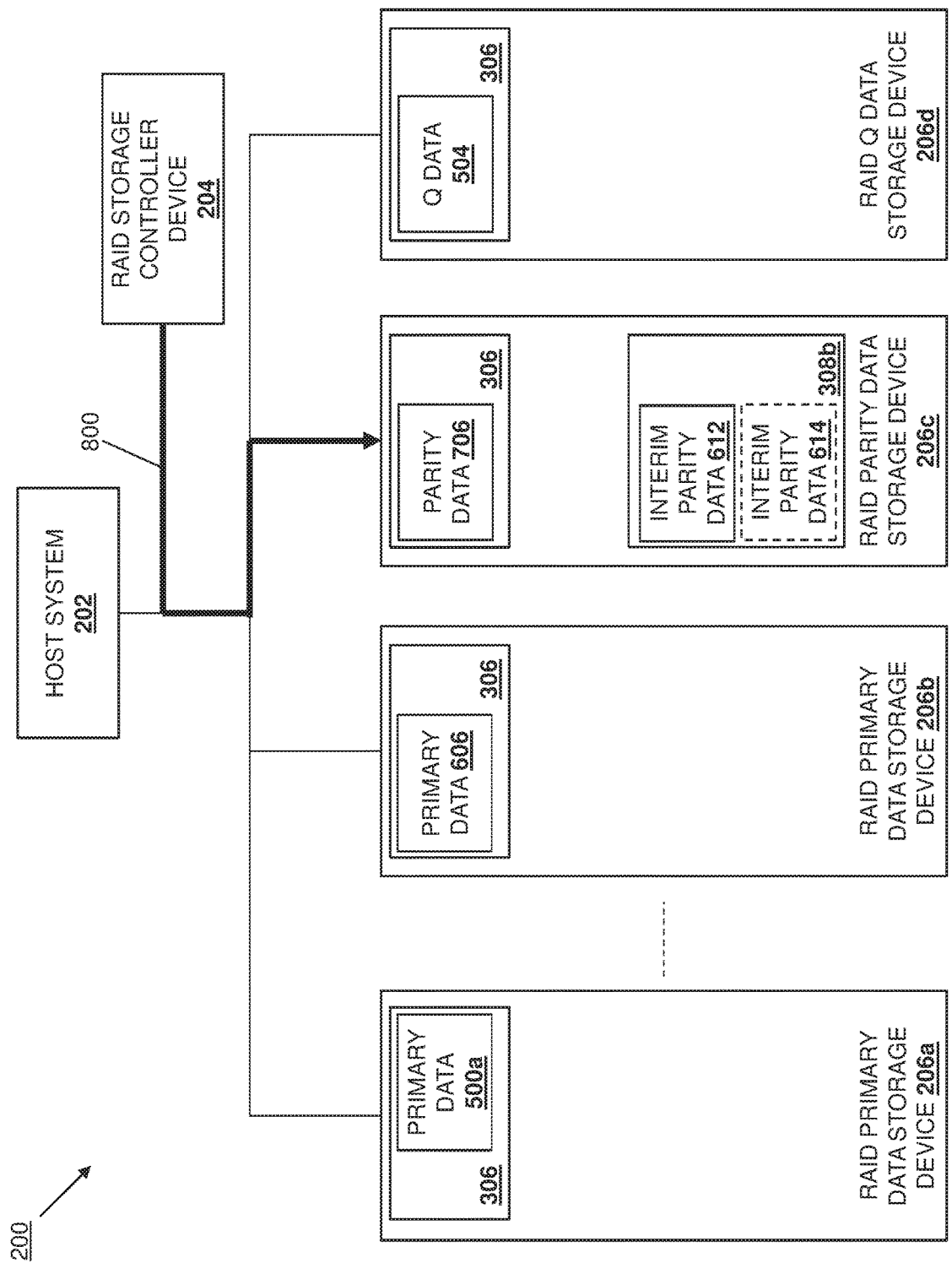
FIG. 8A is a schematic view illustrating an embodiment of the RAID storage system of FIG. 2 operating during the method of FIGS. 4A and 4B.
Figure 8B:
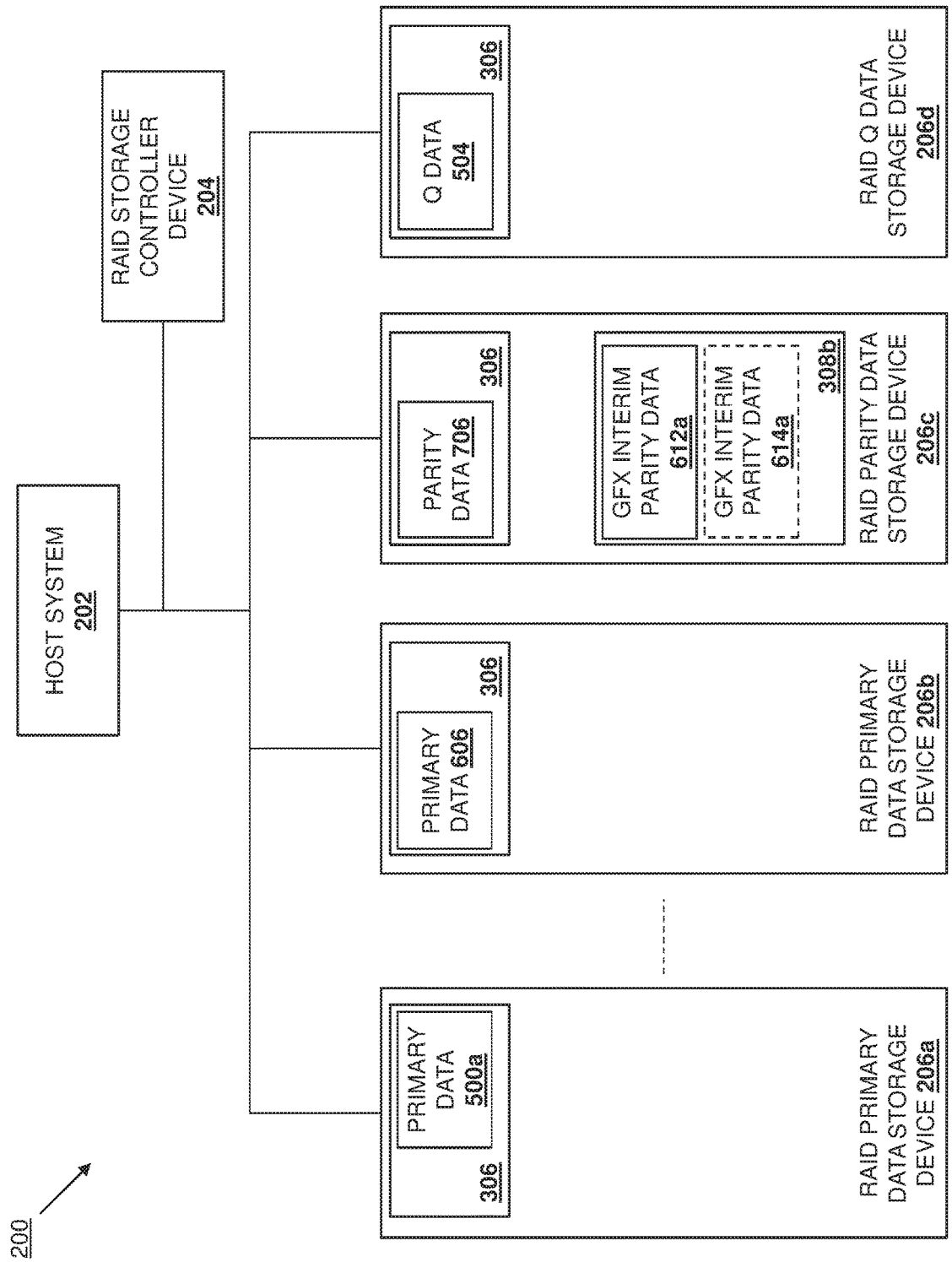
FIG. 8B is a schematic view illustrating an embodiment of the RAID storage system of FIG. 2 operating during the method of FIGS. 4A and 4B.

As such, with reference to FIGS. 8A and 8B and in an embodiment of block 414, the RAID storage engine 304 in the RAID parity data storage device 206c/300 may utilize GF multiplicands retrieved using the command 800 to perform GF operations on the interim parity data 612 in its second buffer subsystem 308b to produce GFX interim parity data 612a (e.g., interim parity data that has been GF multiplied by its respective GF multiplicand), and perform GF operations on the interim parity data 614 in its second buffer subsystem 308b to produce GFX interim parity data 614a. As will be appreciated by one of skill in the art in possession of the present disclosure, the GF operation performed using the interim parity data 612 and 614 stored in the second buffer subsystem 308b may utilize any interim parity data provided by any RAID primary data storage device experiencing a primary data update as discussed above. As such, following block 414, the second buffer subsystem 308b in the RAID parity data storage device 206c may store the GFX interim parity data 612a and the GFX interim parity data 614a produced via the GF operations.

Figure 8C:
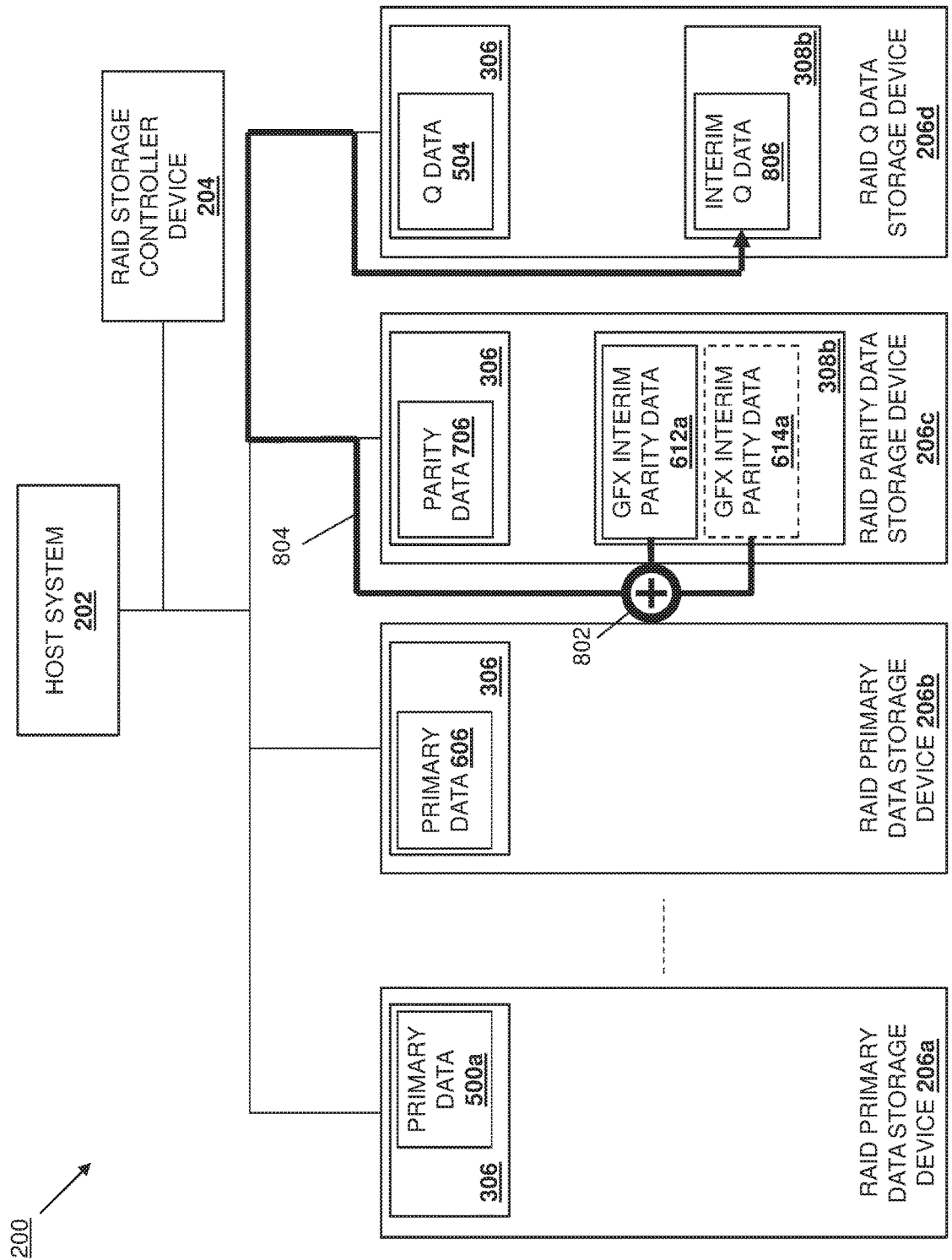
FIG. 8C is a schematic view illustrating an embodiment of the RAID storage system of FIG. 2 operating during the method of FIGS. 4A and 4B.

The method 400 then proceeds to block 416 where the RAID parity data storage device performs an XOR operation on the GF interim parity data to produce new interim Q data, and writes the new interim Q data to a RAID Q data storage device. With reference to FIG. 8C, in an embodiment of block 416 and based on the command 800 (which is a multi-operation command as described above in this embodiment), the RAID storage engine 304 in the RAID parity data storage device 206c/300 may operate to perform an XOR operation 802 using the GFX interim parity data 612a and the GFX interim parity data 614a in its second buffer subsystem 308a in order to produce interim Q data 806, and then perform a DMA operation 804 that writes that interim Q data 806 to the second buffer subsystem 308b (e.g., a CMB) in the RAID Q data storage device 206d.

Figure 8D:
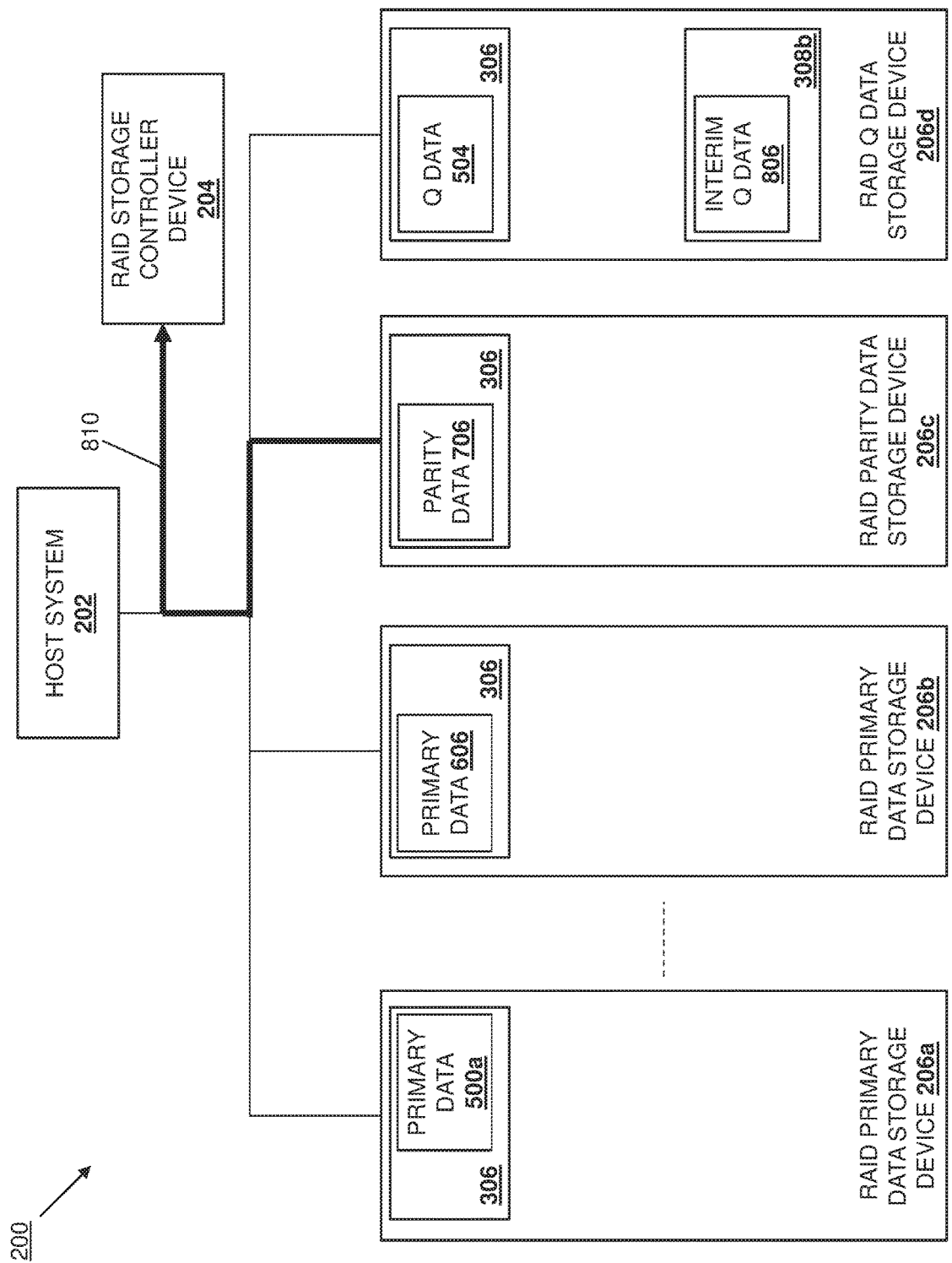
FIG. 8D is a schematic view illustrating an embodiment of the RAID storage system of FIG. 2 operating during the method of FIGS. 4A and 4B.

With reference to FIG. 8D, following completion of the operations associated with the command 800 (e.g., multiple operations associated with a multi-operation command as discussed above, following each operation associated with respective commands, etc.) the RAID storage engine 304 in the RAID parity data storage device 206c/300 may generate and transmit a completion message 810 to the RAID storage controller device 204. For example, the RAID storage engine 304 in the RAID parity data storage device 206c/300 may generate the completion message 810 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure.

As discussed in further detail below, the calculation of interim Q data by the RAID parity data storage device and its provisioning in the RAID Q data storage device 206d allows for the deferral of the calculation of Q data (e.g., to replace the Q data 504) by the RAID Q data storage device 206d, which one of skill in the art in possession of the present disclosure will recognize is relatively time and processing intensive. As such, a Q data determination timeout period may be implemented by the RAID storage controller device 204 and/or the RAID Q data storage device 206d and, as discussed below, during that Q data determination period the RAID Q data storage device 206d may only update interim Q data, rather than the Q data 504 itself. As will be appreciated by one of skill in the art in possession of the present disclosure, the deferral of Q data determinations provides benefits such as reducing the overhead of the Q data calculation and therefore improving latency and/or performance of the overall storage subsystem. For example, the deferral of the Q data calculation in RAID Q data storage device 206d may be performed in place of the updating of each interim parity for each updated primary data storage device that is maintained on the RAID parity data storage device 206c, with the tradeoff of deferring the calculation on RAID parity data storage device 206c to reduce its overhead while requiring more memory space in the secondary buffer on RAID parity data storage device 206c. Similarly, deferral of the Q data calculation only on RAID Q data storage device 206d requires less memory space on RAID Q data storage device 206d, but does not reduce overhead for RAID parity data storage device 206c

Figure 9:
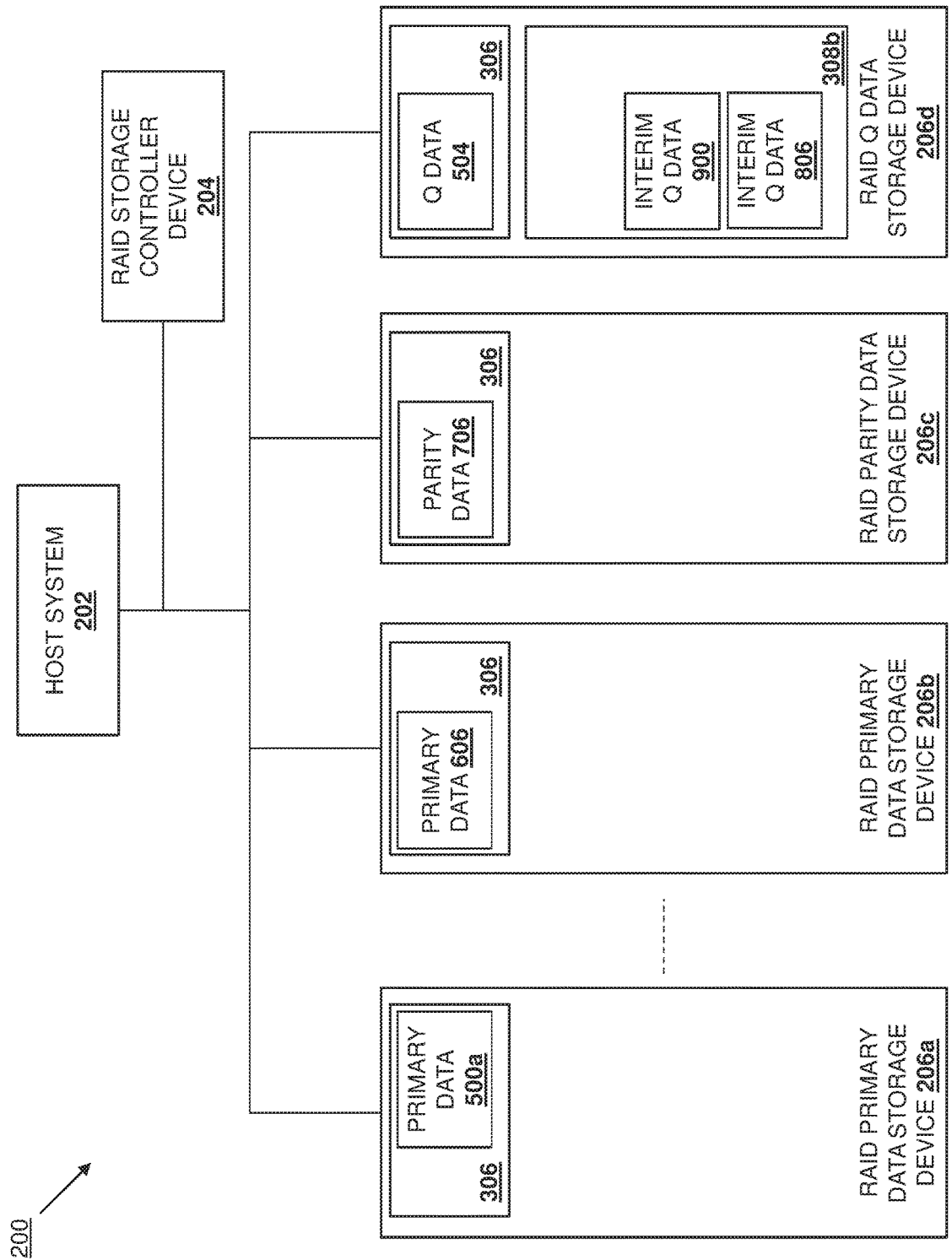
FIG. 9 is a schematic view illustrating an embodiment of the RAID storage system of FIG. 2 operating during the method of FIGS. 4A and 4B.

In the embodiment discussed above, a first iteration of the method 400 has provided the interim Q data 806 in the second buffer subsystem 308b (e.g., a CMB) in the RAID Q data storage device 206d, and because it is the only interim Q data in the second buffer subsystem 308b in the RAID Q data storage device 206d and the Q data determination period has not expired, the RAID storage controller device 204 may transmit a completion message to the host system 202 to indicate that the write command 600 has been completed (not illustrated, but substantially similar to the completion messages described herein), and the method 400 may return to block 402 (method determination block not illustrated) such that the method 400 repeats in substantially the same manner as discussed above. As such, FIG. 9 illustrates how the subsequent iteration of the method 400 in may result in the interim Q data 806 becoming "old" interim Q data 806, and how "new" interim Q data 900 may be produced and stored in the second buffer subsystem 308b in the RAID Q data storage device 206d (in the same manner as described above for the interim Q data 806) along with the "old" interim Q data 806. However, one of skill in the art in possession of the present disclosure will recognize that this specific sequence of operations may only be performed for the first iteration of the method 400 in which interim Q data is initially stored in the second buffer subsystem 308b in the RAID Q data storage device 206d, and that subsequent iterations of the method 400 will proceed substantially as discussed below.

The method 400 then proceeds to block 418 where the RAID Q data storage receives a command from the RAID storage controller device. In an embodiment, at block 418, the RAID storage controller device 204 may generate and transmit a command to a RAID Q data storage device. For example, the RAID storage controller device 204 may determine that the completion message 810 was received from the RAID parity data storage device 206c as discussed above and, in response, at block 418 the RAID storage controller device 204 may generate a command 1000 and transmit the command 1000 to the RAID Q data storage device 206d.

Similarly as discussed above, the command 1000 may be a multi-operation command like those described in U.S. patent application Ser. No. 16/585,296, filed on Sep. 27, 2019. For example, the command 1000 may be an NVMe WRITE Q multi-operation command that is configured to cause the RAID Q data storage device 206d to perform the multiple operations described below. However, while described as providing a multi-operation command at block 418, one of skill in the art in possession of the present disclosure will recognize that the multiple operations performed by the RAID Q data storage device 206d discussed below may be performed in response to respective commands transmitted by the RAID storage controller device 204 while remaining within the scope of the present disclosure as well. In a specific example, the transmission of the command 1000 may include the RAID storage controller device 204 providing the command 1000 in the submission queue that is included in the communication system 310 in the RAID Q data storage device 206d/300, and then ringing a doorbell for the RAID Q data storage device 206d/300. However, one of skill in the art in possession of the present disclosure will recognize that the command 1000 may be provided to the RAID Q data storage device 206d in a variety of manners that will fall within the scope of the present disclosure as well.

As such, in some examples the RAID storage engine 304 in the RAID Q data storage device 206d/300 may respond to the ringing of its doorbell by accessing the command 1000 in the submission queue in its communication system 310. In embodiments in which the command 1000 is a multi-operation command, the RAID storage engine 304 in the RAID Q data storage device 206d/300 may identify the multiple operations instructed by that command 1000 (as described in U.S. patent application Ser. No. 16/585,296, filed on Sep. 27, 2019.)

Figure 10A:
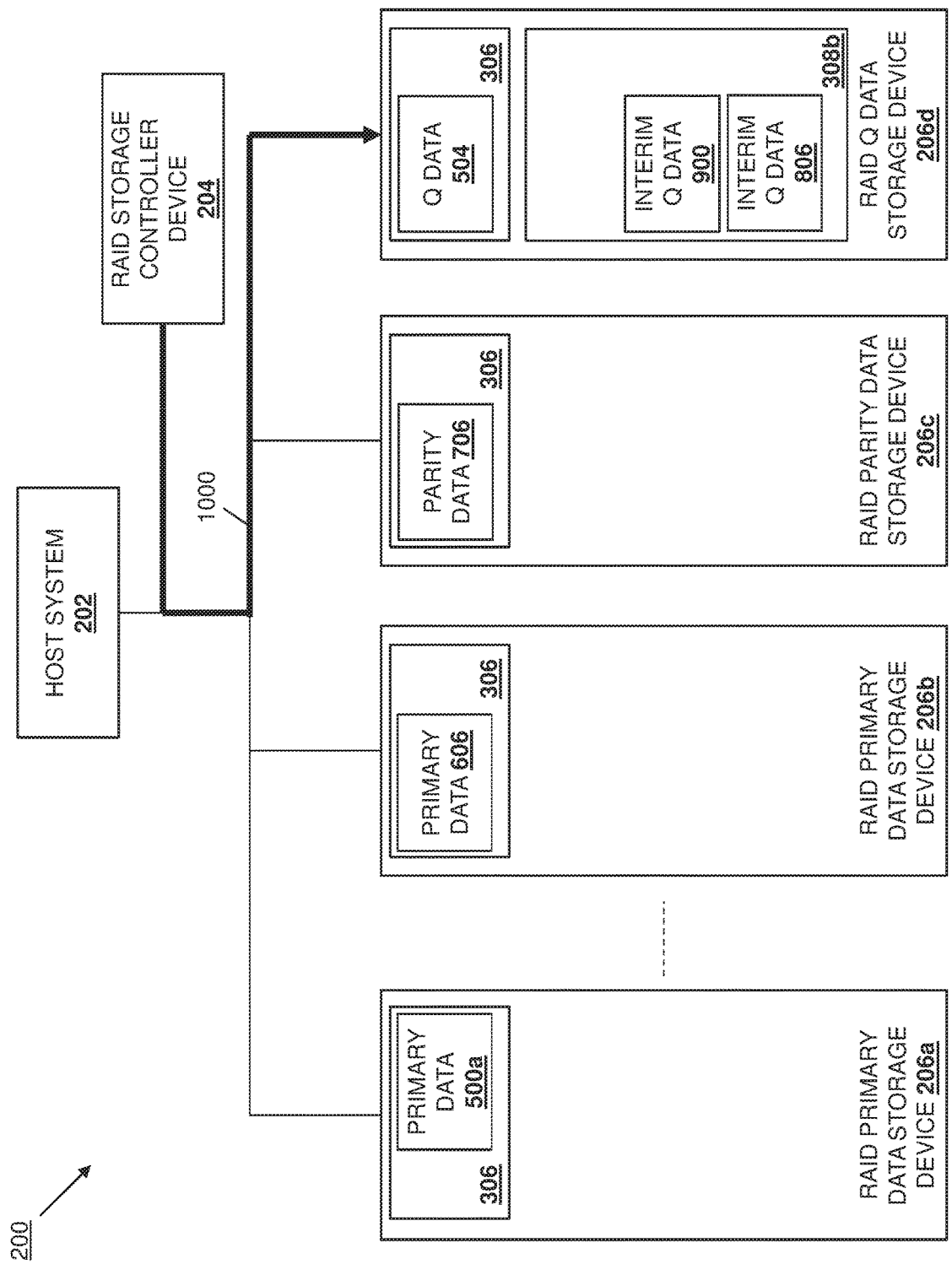
FIG. 10A is a schematic view illustrating an embodiment of the RAID storage system of FIG. 2 operating during the method of FIGS. 4A and 4B.
Figure 10B:
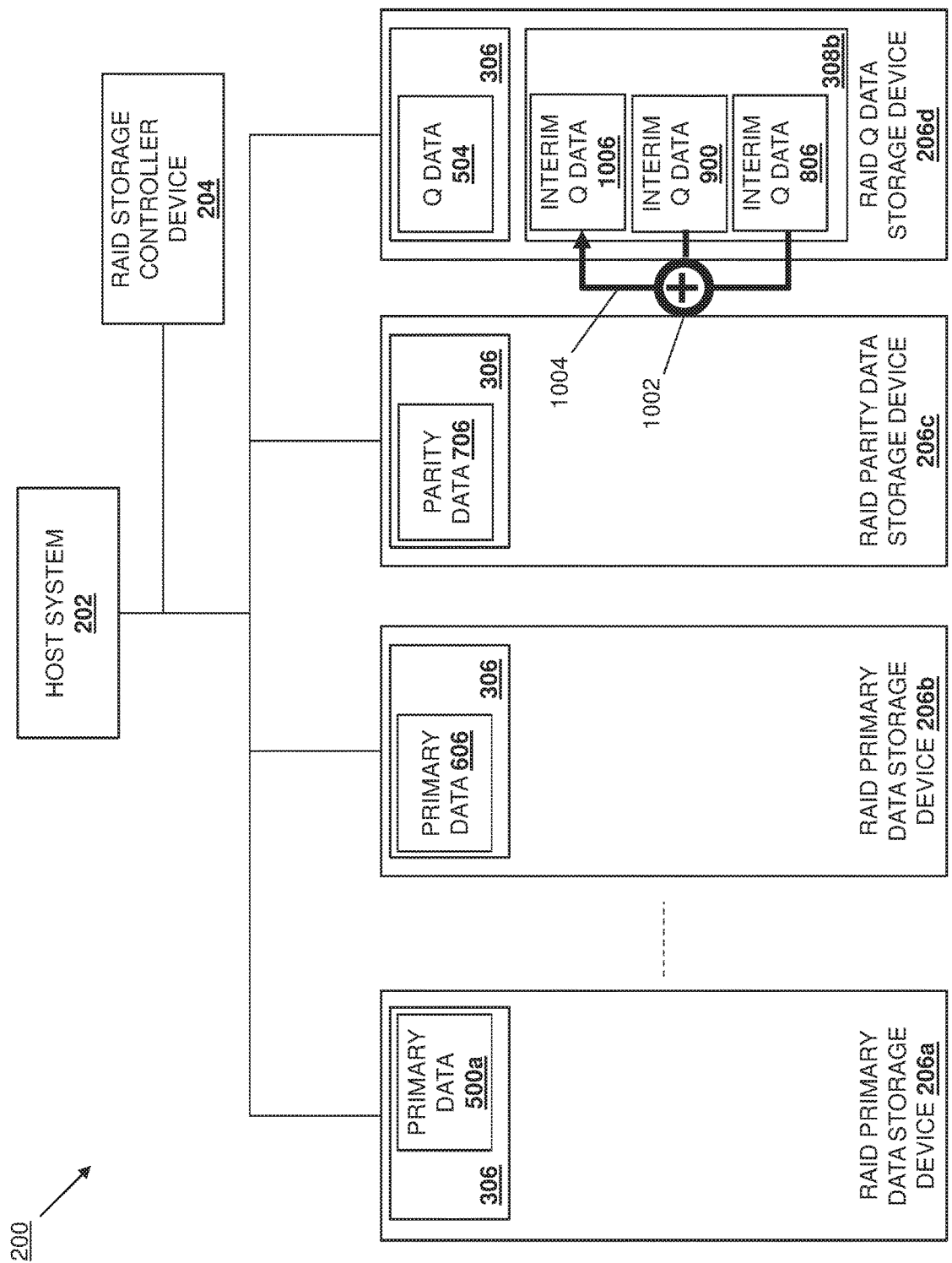
FIG. 10B is a schematic view illustrating an embodiment of the RAID storage system of FIG. 2 operating during the method of FIGS. 4A and 4B.
Figure 10C:
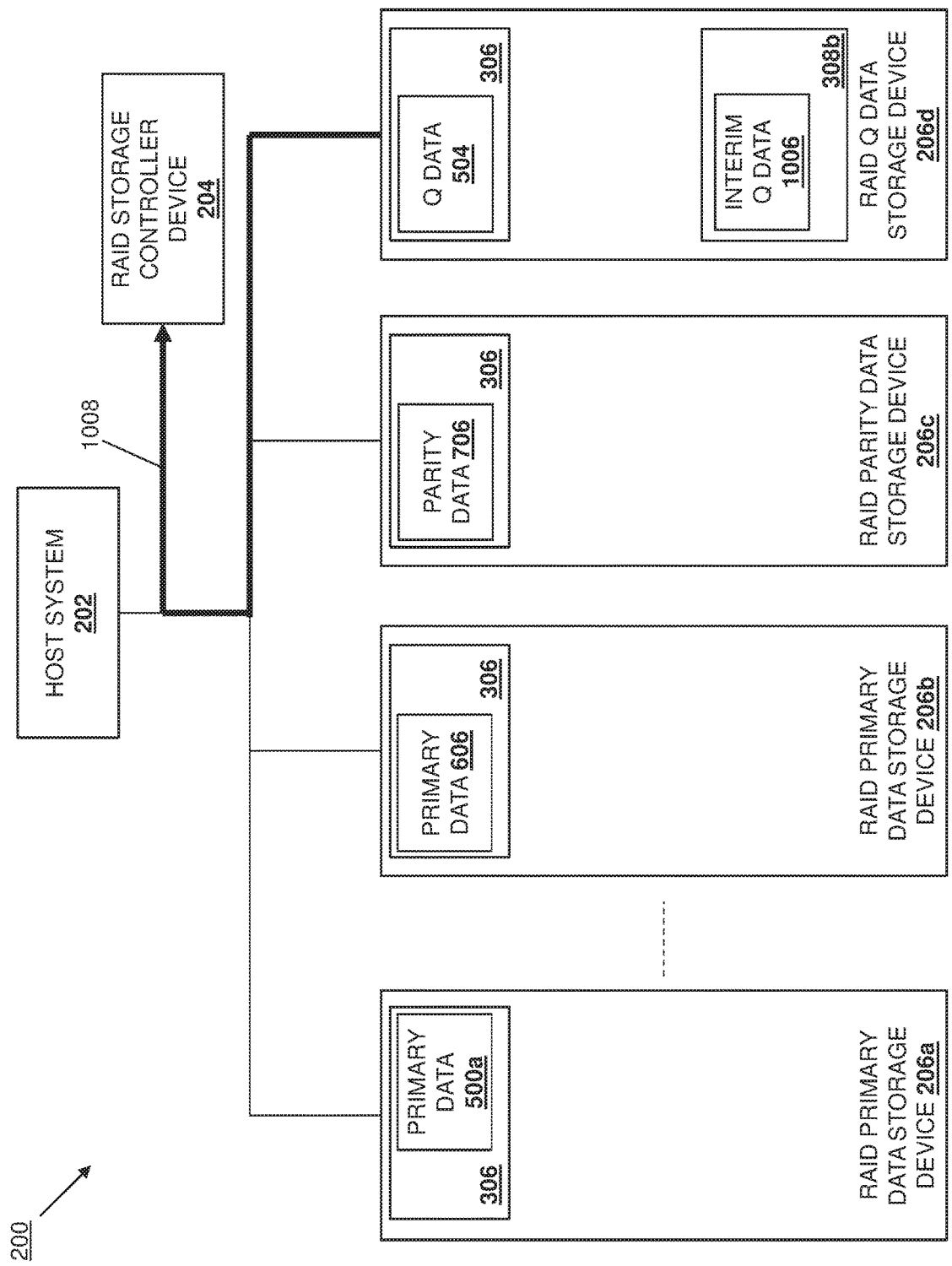
FIG. 10C is a schematic view illustrating an embodiment of the RAID storage system of FIG. 2 operating during the method of FIGS. 4A and 4B.

The method 400 then proceeds to block 420 where the RAID Q data storage device performs an XOR operation on the new interim Q data and old interim Q data to produce updated interim Q data, and overwrites the new interim Q data and the old interim Q data with the updated interim Q data. With reference to FIG. 10B, in an embodiment of block 420 and based on the command 1000 (which is a multi-operation command as described above in this embodiment), the RAID storage engine 304 in the RAID Q data storage device 206d/300 may operate to perform an XOR operation 1002 using the "old" interim Q data 806 and the "new"

interim Q data 900 in its second buffer subsystem 308a in order to produce "updated" interim Q data 1006, and then performs an overwrite operation 1004 to overwrite the "old" interim Q data 806 and the "new" interim Q data 900 with the "updated" interim Q data 1006 (as illustrated by the replacement of the interim Q data 806 and 900 in FIG. 10B with the "updated" interim Q data in FIG. 10C.)

With reference to FIG. 10C, following completion of the operations associated with the command 1000 (e.g., multiple operations associated with a multi-operation command as discussed above, following each operation associated with respective commands, etc.) the RAID storage engine 304 in the RAID Q data storage device 206d/300 may generate and transmit a completion message 1008 to the RAID storage controller device 204. For example, the RAID storage engine 304 in the RAID Q data storage device 206d/300 may generate the completion message 1008 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. In response to receiving the completion message 1008, the RAID storage controller device 204 may transmit a completion message to the host system 202 to indicate that the write command 600 has been completed (not illustrated, but substantially similar to the completion messages described herein).

As discussed above, the calculation of the updated interim Q data by the RAID Q data storage device allows for the deferral of the calculation of Q data (e.g., to replace the Q data 504) by the RAID Q data storage device 206d, which one of skill in the art in possession of the present disclosure will recognize is relatively time and processing intensive. As such, the Q data determination timeout period discussed above may be implemented by the RAID storage controller device 204 and/or the RAID Q data storage device 206d and, as discussed below, during that Q data determination period the RAID Q data storage device 206d may only update interim Q data, rather than the Q data 504 itself. As will be appreciated by one of skill in the art in possession of the present disclosure, the deferral of Q data determinations provides benefits such as reducing the overhead of the Q data calculation and therefore improving latency and/or performance of the overall storage subsystem, discussed above.

The method 400 then proceeds to decision block 422 where it is determined whether a Q data determination timeout has been reached. In an embodiment, at decision block 422, the RAID storage controller device 204 and/or the RAID Q data storage device 206d may monitor the Q data determination timeout period to determine whether it has passed since the end of the previous Q data determination timeout period. As will be appreciated by one of skill in the art in possession of the present disclosure, the Q data determination timeout period may be selected based on a desired level of data redundancy and risk, as the deferral of the updating of the Q data (e.g., the Q data 504 in the illustrated embodiment) can result in an inability to recover unavailable primary data and/or parity data in the event it was updated prior to the determination of the updated interim Q data, but only in the rare case in which two or more storage device failures occur for stripes with Q data that was not updated due to the deferral of the Q data calculation. As such, the Q data determination time period may be any time period that is determined to be appropriate by an administrator of the RAID storage system 200.

If, at decision block 422, it is determined that the Q data determination timeout has not been reached, the method 400 returns to block 402 and the method 400 repeats substantially as discussed above. In an embodiment, following block 420 and in the event the Q data determination timeout is not reached, the updated interim Q data 1006 becomes the "old interim Q data" discussed above. As such, as long as the Q data determination timeout does not occur, the method 400 may repeat, with new interim Q data being produced and used with the old interim Q data in an XOR operation at block 420 to provide updated interim Q data for each iteration of the method 400. Thus, as long as the Q data determination timeout does not occur, the determination of new Q data to replace currently existing Q data (e.g., the Q data 504 in this example) is deferred.

If, at decision block 422, it is determined that the Q data determination timeout has been reached, the method 400 proceeds to block 424 where the RAID Q data storage device receives a command from the RAID storage controller device. In an embodiment, at block 422, the RAID storage controller device 204 may generate and transmit a command to the RAID Q data storage device. For example, the RAID storage controller device 204 may determine that the Q data determination timeout has expired and, in response to receiving the completion message 1008, at block 422 the RAID storage controller device 204 may generate a command 1100 and transmit the command 1100 to the RAID Q data storage device 206d.

Similarly as discussed above, the command 1100 may be a multi-operation command like those described in U.S. patent application Ser. No. 16/585,296, filed on Sep. 27, 2019. For example, the command 1100 may be an NVMe WRITE Q multi-operation command that is configured to cause the RAID Q data storage device 206d to perform the multiple operations described below. However, while described as providing a multi-operation command at block 422, one of skill in the art in possession of the present disclosure will recognize that the multiple operations performed by the RAID Q data storage device 206d discussed below may be performed in response to respective commands transmitted by the RAID storage controller device 204 while remaining within the scope of the present disclosure as well. In a specific example, the transmission of the command 1100 may include the RAID storage controller device 204 providing the command 1100 in the submission queue that is included in the communication system 310 in the RAID Q data storage device 206d/300, and then ringing a doorbell for the RAID Q data storage device 206d/300. However, one of skill in the art in possession of the present disclosure will recognize that the command 1000 may be provided to the RAID Q data storage device 206d in a variety of manners that will fall within the scope of the present disclosure as well.

As such, in some examples the RAID storage engine 304 in the RAID Q data storage device 206d/300 may respond to the ringing of its doorbell by accessing the command 1100 in the submission queue in its communication system 310. In embodiments in which the command 1100 is a multi-operation command, the RAID storage engine 304 in the RAID Q data storage device 206d/300 may identify the multiple operations instructed by that command 1000 (as described in U.S. patent application Ser. No. 16/585,296, filed on Sep. 27, 2019.) One of skill in the art in possession of the present disclosure will recognize that the method 400 is described above with the Q data determination timeout being monitored by the RAID storage controller device 204 such that, once that Q data determination timeout is reached, the command 1100 is sent that causes the determination of new Q data. However, in other embodiments, the RAID storage controller device 204 may instead send the command 1100 that is substantially similar to the command 800 discussed above, and the RAID Q data storage device 206d may execute those commands 800 and 1100 differently (as described herein) based on the determination of whether the Q data determination timeout has been reached (e.g., determining updated interim Q data in the event the Q data determination timeout has not been reached, and determining updated Q data in the event the Q data determination timeout has been reached.)

Figure 11A:
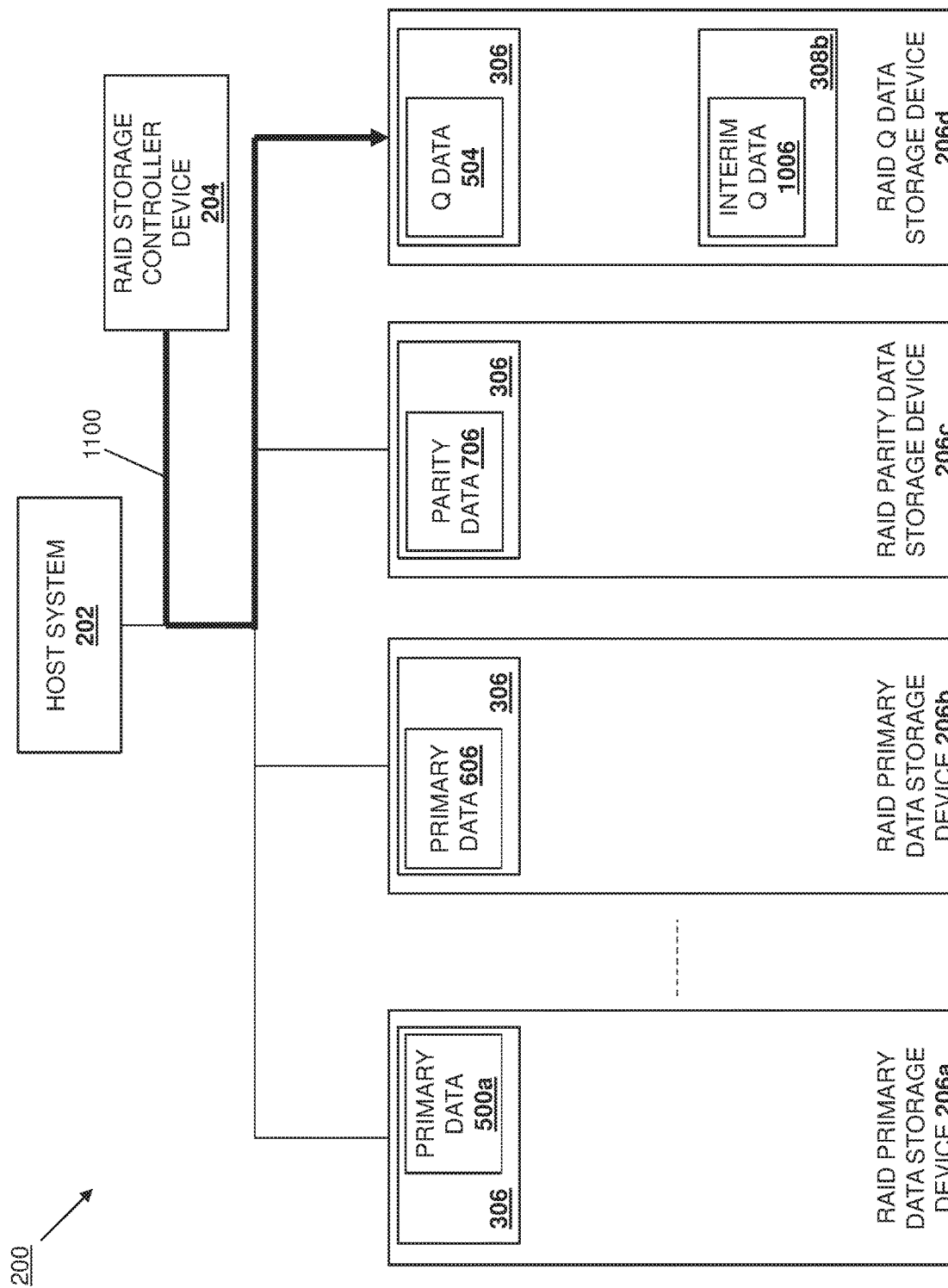
FIG. 11A is a schematic view illustrating an embodiment of the RAID storage system of FIG. 2 operating during the method of FIGS. 4A and 4B.
Figure 11B:
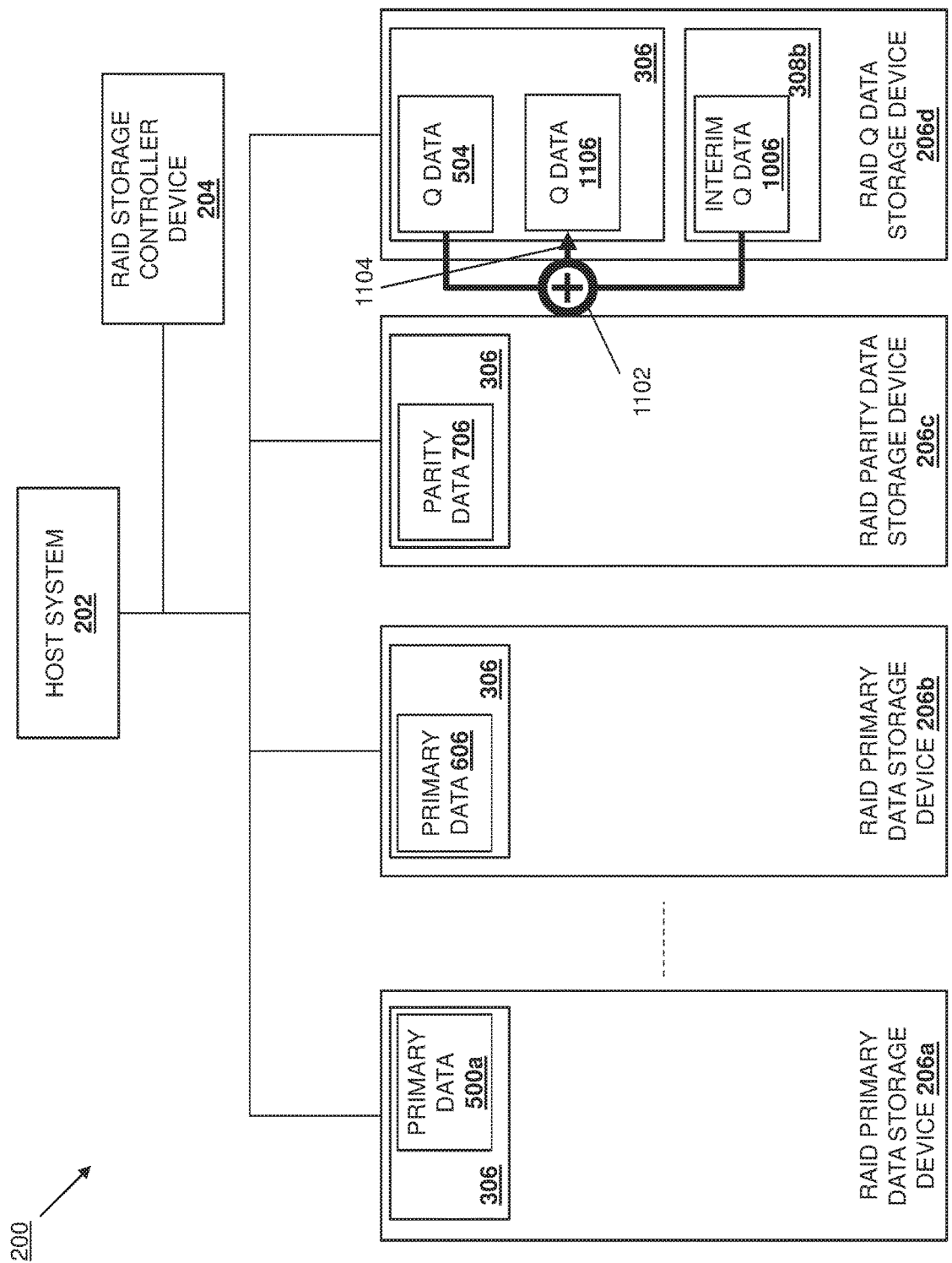
FIG. 11B is a schematic view illustrating an embodiment of the RAID storage system of FIG. 2 operating during the method of FIGS. 4A and 4B.

The method 400 then proceeds to block 426 where the RAID Q data storage device performs an XOR operation on first Q data and the updated interim Q data to produce second Q data, and overwrites the first Q data with the second Q data. With reference to FIG. 11B, in an embodiment of block 426 and based on the command 1100 (which is a multi-operation command as described above in this embodiment), the RAID storage engine 304 in the RAID Q data storage device 206d/300 may operate to perform an XOR operation 1102 using the 0 data 504 in its storage subsystem 306 and the "updated" interim Q data 1006 in its second buffer subsystem 308a in order to produce "new" Q data 1106, and then performs an overwrite operation 1104 to overwrite the "old" Q data 504 with the "new" Q data 1106 (as illustrated by the replacement of the "old" Q data 504 in FIG. 11B with the "new" Q data 1106 in FIG. 11C.) As will be appreciated by one of skill in the art in possession of the present disclosure, the "new" Q data 1006 may allow for the recovery of the primary data 500a-606 and, in some cases, the parity data 706, in the event that data on any two of the RAID primary data storage devices 206a-206b and, in some cases, the RAID parity data storage device 206c, becomes unavailable.

Figure 11C:
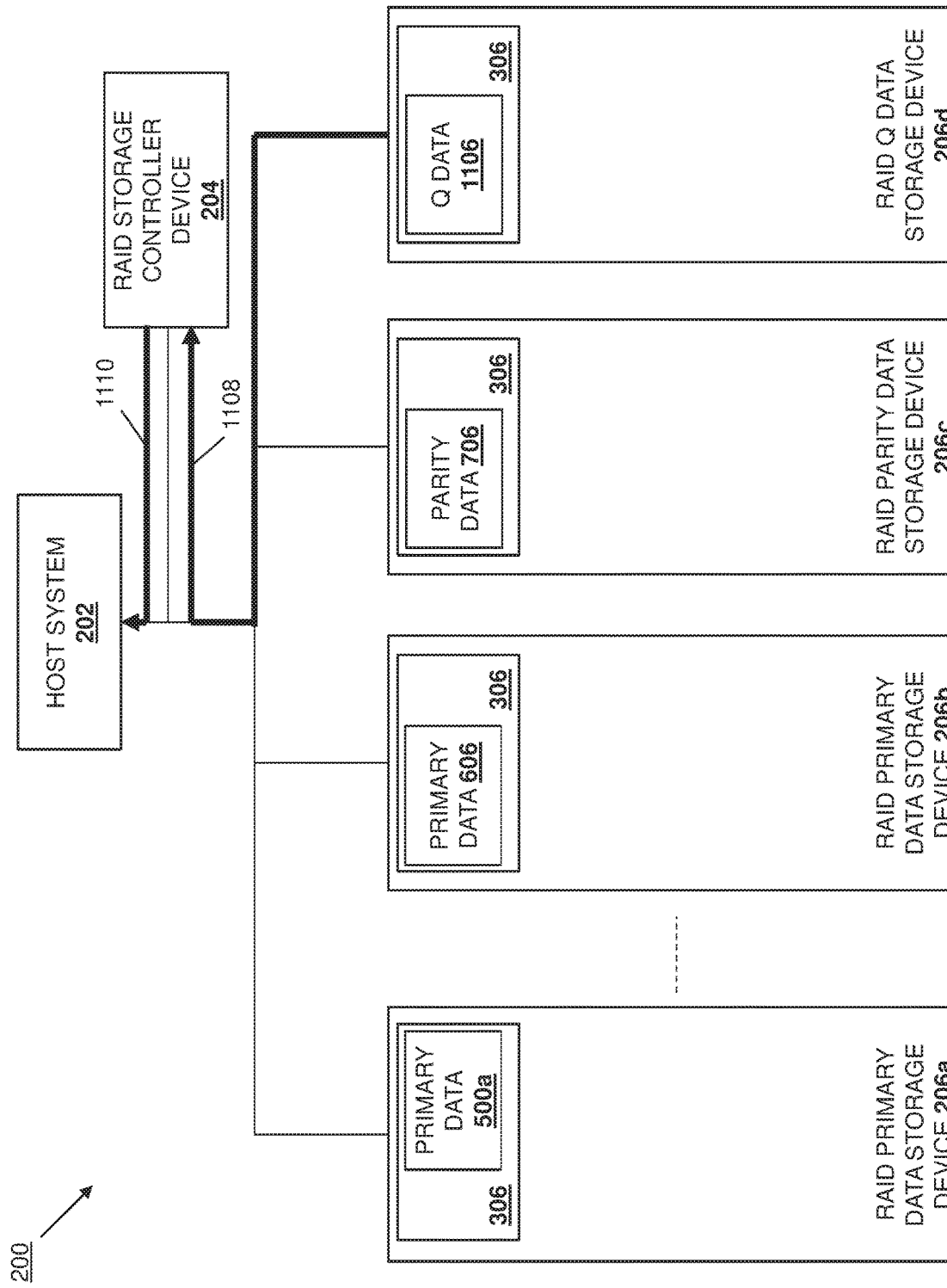
FIG. 11C is a schematic view illustrating an embodiment of the RAID storage system of FIG. 2 operating during the method of FIGS. 4A and 4B.

With reference to FIG. 11C, following completion of the operations associated with the command 1100 (e.g., multiple operations associated with a multi-operation command as discussed above, following each operation associated with respective commands, etc.) the RAID storage engine 304 in the RAID Q data storage device 206d/300 may generate and transmit a completion message 1108 to the RAID storage controller device 204. For example, the RAID storage engine 304 in the RAID Q data storage device 206d/300 may generate the completion message 1108 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. As also illustrated in FIG. 11C, following the receiving of the completion message 1108, the RAID storage controller device 204 may generate and transmit a completion message 1110 to the host system 202 in order to indicate to the host system that the write command 600 has been completed.

Thus, systems and methods have been described that provide for the performance of deferred Q data determination operations to backup data in a RAID storage system with the assistance of the RAID storage devices that store that data. For example, a RAID primary data storage device may retrieve second primary data from a host system via a first DMA operation, perform an XOR operation on first primary data in its first storage subsystem and the second primary data to produce first interim parity data, and write the first interim parity data to a second buffer subsystem in a RAID parity data storage device via a second DMA operation. The RAID parity data storage device may then perform an XOR operation on first parity data in its second storage subsystem and the first interim parity data in the second buffer subsystem to produce second parity data, and overwrite the first parity data with the second parity data in the second storage subsystem. The RAID parity data storage device may then perform GF operations on the first interim parity data and second interim parity data in the second buffer subsystem to produce first GF interim parity data and second GF interim parity data, perform an XOR operation on the first GF interim parity data and the second GF interim parity data to produce new interim Q data, and write the new interim Q data to a third buffer subsystem in a RAID Q data storage device that already stores old interim Q data. The RAID Q data storage device may then perform an XOR operation on new interim Q data and the old interim Q data in its third buffer subsystem to produce updated interim Q data, and overwrite the new interim Q data and the old interim Q data with the updated interim Q data in its third buffer subsystem. Any updated interim Q data provided in the third buffer subsystem in such a manner becomes the old interim Q data on subsequent iterations of the method, and as long as a Q data determination timeout is not reached, and the method may loop multiple times to produce and write updated interim Q data to the third buffer subsystem. In the event the Q data determination timeout is reached, the RAID Q data storage device may perform an XOR operation on first Q data in its storage subsystem and the updated Q data in its third buffer subsystem to produce second Q data, and overwrite the first Q data with the second Q data. As such, Q data determinations may be deferred, and the deferral of those Q data determination operations are offloaded from the RAID storage controller device, thus increasing the ability of the RAID storage controller device to scale with high performance RAID storage devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disk (RAID) storage-device-assisted deferred Q data determination system, comprising:
   a host system;
   a Redundant Array of Independent Disk (RAID) storage controller device that is coupled to the host system; and
   a plurality of RAID storage devices that are each coupled to both the host system and the RAID storage controller device, wherein the plurality of RAID storage devices include:
   a first RAID primary data storage device that includes a first storage subsystem storing first primary data, wherein the first RAID primary data storage device is configured, in response to a first command received from the RAID storage controller device, to:
retrieve, via a first Direct Memory Access (DMA) operation from the host system, second primary data;
perform an XOR operation on the first primary data in the first storage subsystem and the second primary data to produce first interim parity data; and
write, via a second DMA operation to a second buffer subsystem in a RAID parity data storage device that is included in the plurality of RAID storage devices, the first interim parity data;
the RAID parity data storage device that includes a second storage subsystem storing first parity data and the second buffer subsystem storing the first interim parity data and second interim parity data, wherein the RAID parity data storage device is configured, in response to a second command received from the RAID storage controller device, to:
perform an XOR operation on the first parity data in the second storage subsystem and the first interim parity data in the second buffer subsystem to produce second parity data; and
overwrite, in the second storage subsystem, the first parity data with the second parity data; and
wherein the RAID parity data storage device is configured, in response to a third command received from the RAID storage controller device, to:
perform Galois Field (GF) operations on the first interim parity data and the second interim parity data in the second buffer subsystem to produce first GF interim parity data and second GF interim parity data;
perform an XOR operation on the first GF interim parity data and the second GF interim parity data to produce first interim Q data; and
write, via a third DMA operation to a third buffer subsystem in a RAID Q data storage device that is included in the plurality of RAID storage devices, the first interim Q data; and
the RAID Q data storage device that includes a third storage subsystem storing first Q data and the third buffer subsystem storing the first interim Q data and second interim Q data, wherein the RAID Q data storage device is configured, in response to a fourth command received from the RAID storage controller device, to:
perform an XOR operation on the first interim Q data and the second interim Q data in the third buffer subsystem to produce third interim Q data; and
overwrite, in the third buffer subsystem, the first interim Q data and the second interim Q data with the third interim Q data; and
wherein the RAID Q data storage device is configured, in response to a fifth command received from the RAID storage controller device, to:
perform an XOR operation on the first Q data in the third storage subsystem and the third interim Q data in the third buffer subsystem to produce second Q data; and
overwrite, in the third storage subsystem, the first Q data with the second Q data.

2. The system of claim 1, wherein the plurality of RAID storage devices include:

a second RAID primary data storage device that includes a fourth storage subsystem storing third primary data, wherein second first RAID primary data storage device is configured, in response to a sixth command received from the RAID storage controller device, to:
retrieve, via a fourth DMA operation from the host system, fourth primary data;
perform an XOR operation on the third primary data in the fourth storage subsystem and the fourth primary data to produce the second interim parity data; and
write, via a fifth DMA operation to the second buffer subsystem in the RAID parity data storage device, the second interim parity data.

3. The system of claim 1, wherein the first RAID primary data storage device is configured to:
overwrite, in the first storage subsystem, the first primary data with the second primary data.

4. The system of claim 1, wherein the second buffer subsystem is a Controller Memory Buffer (CMB) included in the RAID parity data storage device, and the third buffer subsystem is a CMB included in the RAID Q data storage device.

5. The system of claim 1, wherein the first RAID primary data storage device is configured, in response writing the first interim parity data to the second buffer subsystem in the RAID parity data storage device, to:
provide a completion message to the RAID storage controller device, wherein the RAID storage controller device is configured to:
provide the second command to the RAID parity data storage device in response to receiving the completion message.

6. The system of claim 1, wherein the RAID parity data storage device is configured, in response overwriting the first parity data with the second parity data in the second storage subsystem, to:
provide a first completion message to the RAID storage controller device, wherein RAID storage controller device is configured to:
provide the third command to the RAID parity data storage device in response to receiving the first completion message; and
wherein the RAID parity data storage device is configured, in response to writing the interim Q data to the third buffer subsystem in the RAID Q data storage device, to:
provide a second completion message to the RAID storage controller device, wherein the RAID storage controller device is configured to:
provide the fourth command to the RAID Q data storage device in response to receiving the second completion message.

7. An Information Handling System (IHS), comprising:
a first Redundant Array of Independent Disk (RAID) primary data storage device that includes a first storage subsystem storing first primary data, wherein the first RAID primary data storage device is configured, in response to a first command received from a RAID storage controller device, to:
retrieve, via a first Direct Memory Access (DMA) operation from a host system, second primary data;
perform an XOR operation on the first primary data in the first storage subsystem and the second primary data to produce first interim parity data; and
write, via a second DMA operation to a second buffer subsystem in a RAID parity data storage device, the first interim parity data;

the RAID parity data storage device that includes a second storage subsystem storing first parity data and the second buffer subsystem storing the first interim parity data and second interim parity data, wherein the RAID parity data storage device is configured, in response to a second command received from the RAID storage controller device, to:
  perform an XOR operation on the first parity data in the second storage subsystem and the first interim parity data in the second buffer subsystem to produce second parity data; and
  overwrite, in the second storage subsystem, the first parity data with the second parity data; and
wherein the RAID parity data storage device is configured, in response to a third command received from the RAID storage controller device, to:
  perform Galois Field (GF) operations on the first interim parity data and the second interim parity data in the second buffer subsystem to produce first GF interim parity data and second GF interim parity data;
  perform an XOR operation on the first GF interim parity data and the second GF interim parity data to produce first interim Q data; and
  write, via a third DMA operation to a third buffer subsystem in a RAID Q data storage device, the first interim Q data; and
the RAID Q data storage device that includes a third storage subsystem storing first Q data and the third buffer subsystem storing the first interim Q data and second interim Q data, wherein the RAID Q data storage device is configured, in response to a fourth command received from the RAID storage controller device, to:
  perform an XOR operation on the first interim Q data and the second interim Q data in the third buffer subsystem to produce third interim Q data; and
  overwrite, in the third buffer subsystem, the first interim Q data and the second interim Q data with the third interim Q data; and
wherein the RAID Q data storage device is configured, in response to a fifth command received from the RAID storage controller device, to:
  perform an XOR operation on the first Q data in the third storage subsystem and the third interim Q data in the third buffer subsystem to produce second Q data; and
  overwrite, in the third storage subsystem, the first Q data with the second Q data.

8. The IHS of claim 7, further comprising:
a second RAID primary data storage device that includes a fourth storage subsystem storing third primary data, wherein second first RAID primary data storage device is configured, in response to a sixth command received from the RAID storage controller device, to:
  retrieve, via a fourth DMA operation from the host system, fourth primary data;
  perform an XOR operation on the third primary data in the fourth storage subsystem and the fourth primary data to produce the second interim parity data; and
  write, via a sixth DMA operation to the second buffer subsystem in the RAID parity data storage device, the second interim parity data.

9. The IHS of claim 7, wherein the first RAID primary data storage device is configured to:
  overwrite, in the first storage subsystem, the first primary data with the second primary data.

10. The IHS of claim 7, wherein the second buffer subsystem is a Controller Memory Buffer (CMB) included in the RAID parity data storage device, and the third buffer subsystem is a CMB included in the RAID Q data storage device.

11. The IHS of claim 7, wherein the first RAID primary data storage device is configured, in response writing the first interim parity data to the second buffer subsystem in the RAID parity data storage device, to:
  provide a completion message to the RAID storage controller device, wherein the RAID storage controller device is configured to:
    provide the second command to the RAID parity data storage device in response to receiving the completion message.

12. The IHS of claim 7, wherein the RAID parity data storage device is configured, in response overwriting the first parity data with the second parity data in the second storage subsystem, to:
  provide a first completion message to the RAID storage controller device, wherein RAID storage controller device is configured to:
    provide the third command to the RAID parity data storage device in response to receiving the first completion message; and
wherein the RAID parity data storage device is configured, in response to writing the interim Q data to the third buffer subsystem in the RAID Q data storage device, to:
  provide a second completion message to the RAID storage controller device, wherein the RAID storage controller device is configured to:
    provide the fourth command to the RAID Q data storage device in response to receiving the second completion message.

13. The IHS of claim 7, wherein the RAID Q data storage device is configured, in response to overwriting the first interim Q data and the second interim Q data with the third interim Q data in the third buffer subsystem, to:
  provide a completion message to the RAID storage controller device, wherein the RAID storage controller device is configured to:
    provide the fifth command to the RAID Q data storage device in response to receiving the completion message.

14. A method for assisting with deferred Q data determination operations using Redundant Array of Independent Disk (RAID) storage devices, comprising:
  receiving, by a first Redundant Array of Independent Disk (RAID) primary data storage device from a RAID storage controller device, a first command and, in response:
    retrieving, by the first Redundant Array of Independent Disk (RAID) primary data storage device via a first Direct Memory Access (DMA) operation from a host system, second primary data;
    performing, by the first RAID primary data storage device, an XOR operation on first primary data in a first storage subsystem in the first RAID primary data storage device and the second primary data to produce first interim parity data; and
    writing, by the first RAID primary data storage device via a second DMA operation to a second buffer subsystem in a RAID parity data storage device, the first interim parity data;

receiving, by the RAID parity data storage device from the RAID storage controller device, a second command and, in response:
   performing, by the RAID parity data storage device, an XOR operation on first parity data in a second storage subsystem in the RAID parity data storage device and the first interim parity data in the second buffer subsystem to produce second parity data; and
   overwriting, by the RAID parity data storage device in the second storage subsystem, the first parity data with the second parity data;
receiving, by the RAID parity data storage device from the RAID storage controller device, a third command and, in response:
   performing, by the RAID parity data storage device, Galois Field (GF) operations on the first interim parity data and second interim parity data in the second buffer subsystem to produce first GF interim parity data and second GF interim parity data;
   performing, by the RAID parity data storage device, an XOR operation on the first GF interim parity data and the second GF interim parity data to produce first interim Q data; and
   writing, by the RAID parity data storage device via a third DMA operation to a third buffer subsystem in a RAID Q data storage device, the first interim Q data; and
receiving, by the RAID Q data storage device from the RAID storage controller device, a fourth command and, in response:
   performing, by the RAID Q data storage device, an XOR operation on the first interim Q data and second interim Q data in the third buffer subsystem to produce third interim Q data; and
   overwriting, by the RAID Q data storage device in the third buffer subsystem, the first interim Q data and the second interim Q data with the third interim Q data; and
receiving, by the RAID Q data storage device from the RAID storage controller device, a fifth command and, in response:
   performing, by the RAID Q data storage device, an XOR operation on the first Q data in the third storage subsystem and the third interim Q data in the third buffer subsystem to produce second Q data; and
   overwriting, by the RAID Q data storage device in the third storage subsystem, the first Q data with the second Q data.

15. The method of claim 14, further comprising:
receiving, by a second RAID primary data storage device from the RAID storage controller device, a sixth command and, in response:
   retrieving, by the second RAID primary data storage device via a fourth DMA operation from a host system, third primary data;
   performing, by the second RAID primary data storage device, an XOR operation on fourth primary data in a fourth storage subsystem in the second RAID primary data storage device and the third primary data to produce the second interim parity data; and
   writing, by the second RAID primary data storage device via a fifth DMA operation to the second buffer subsystem in the RAID parity data storage device, the second interim parity data.

16. The method of claim 14, further comprising:
overwriting, by the first RAID primary data storage device in the first storage subsystem, the first primary data with the second primary data.

17. The method of claim 14, wherein the second buffer subsystem is a Controller Memory Buffer (CMB) included in the RAID parity data storage device, and the third buffer subsystem is a CMB included in the RAID Q data storage device.

18. The method of claim 14, further comprising:
providing, by the first RAID primary data storage device in response writing the first interim parity data to the second buffer subsystem in the RAID parity data storage device, a completion message to the RAID storage controller device; and
providing, by the RAID storage controller device in response to receiving the completion message, the second command to the RAID parity data storage device.

19. The method of claim 14, further comprising:
providing, by the RAID parity data storage device in response overwriting the first parity data with the second parity data in the second storage subsystem, a first completion message to the RAID storage controller device;
providing, by the RAID parity data storage device in response to receiving the first completion message, the third command to the RAID parity data storage device;
providing, by the RAID parity data storage device in response to writing the interim Q data to the third buffer subsystem in the RAID Q data storage device, a second completion message to the RAID storage controller device; and
providing, by the RAID storage controller device in response to receiving the second completion message, the fourth command to the RAID Q data storage device.

20. The method of claim 19, further comprising:
providing, by the RAID Q data storage device in response overwriting the first interim Q data and the second interim Q data with the third interim Q data in the third buffer subsystem, a completion message;
providing, by the RAID storage controller device in response to receiving the completion message, the fifth command to the RAID Q data storage device.

* * * * *